US007045358B2

(12) United States Patent
Chandler, Jr.

(10) Patent No.: US 7,045,358 B2
(45) Date of Patent: May 16, 2006

(54) PARALLEL REACTOR FOR SAMPLING AND CONDUCTING IN SITU FLOW-THROUGH REACTIONS AND A METHOD OF USING SAME

(75) Inventor: William H. Chandler, Jr., Milpitas, CA (US)

(73) Assignee: Symyx Technologies, Inc., Santa Clara, CA (US)

( * ) Notice: Subject to any disclaimer, the term of this patent is extended or adjusted under 35 U.S.C. 154(b) by 223 days.

(21) Appl. No.: 10/665,796

(22) Filed: Sep. 19, 2003

(65) Prior Publication Data
US 2004/0063208 A1   Apr. 1, 2004

Related U.S. Application Data

(62) Division of application No. 09/826,606, filed on Apr. 5, 2001, now Pat. No. 6,692,708.

(51) Int. Cl.
*G01N 33/00* (2006.01)
*G01N 31/00* (2006.01)

(52) U.S. Cl. ............. 436/34; 436/37; 436/43; 422/104; 422/131; 422/236; 422/62; 422/100; 422/110; 422/116; 422/129; 422/130; 422/50; 422/81; 422/297

(58) Field of Classification Search ......... 422/104, 422/131, 236.62, 100, 110, 116, 129, 130, 422/50, 81, 297; 436/34, 37, 43
See application file for complete search history.

(56) References Cited

U.S. PATENT DOCUMENTS 4,676,951 A   6/1987  Armes et al.
(Continued)

FOREIGN PATENT DOCUMENTS

DE     32 28 794 A1    2/1984
(Continued)

OTHER PUBLICATIONS

Abstract for German Patent No. 32 28 794 A1, entitled *Device for Heating up Reaction Cells and Keeping them Warm*, published Feb. 2, 1984, 1 page.

(Continued)

*Primary Examiner*—Glenn Caldarola
*Assistant Examiner*—Alexis Wachtel
(74) *Attorney, Agent, or Firm*—Senniger Powers

(57) ABSTRACT

An apparatus for parallel processing of reaction mixtures, including a reactor block including reaction chambers for containing reaction mixtures under pressure, the reactor block further including a first sidewall, a second sidewall, and a first plurality of fluid flow paths providing fluid communication with the first sidewall and respective reaction chambers and the second sidewall and respective reaction chambers; a stirring system including a base plate defining a second plurality of flow paths, wherein respective flow paths of said second plurality of flow paths are in fluid communication with respective reaction chambers and respective fluid flow paths of said first plurality of flow paths, and the base plate also supports a plurality of stirring blade assemblies for mixing the reaction mixtures; interchangeable manifolds supported by the first sidewall and the second sidewall, the interchangeable manifolds defining a plurality of manifold inlet/outlet ports, wherein respective inlet/outlet ports of said plurality of inlet/outlet ports are in communication with respective fluid flow paths of said first plurality of fluid flow paths and permit fluid to be introduced into or vented from the respective reaction chambers; and a sampling manifold assembly coupled in fluid communication with the respective reaction chambers, wherein a portion of the reaction mixture retained in the respective reaction chambers can be withdrawn from the respective reaction chamber through respective fluid flow paths of said first plurality of fluid flow paths and respective flow paths of said second plurality of flow paths, or both, without depressurizing or lowering the pressure in the respective reaction chamber.

40 Claims, 17 Drawing Sheets

U.S. PATENT DOCUMENTS

| | | | |
|---|---|---|---|
| 4,929,614 A | 5/1990 | Calvet et al. | |
| 4,954,149 A | 9/1990 | Fullemann | |
| 5,709,840 A | 1/1998 | Juranas | |
| 5,711,917 A | 1/1998 | Juranas et al. | |
| 5,714,127 A | 2/1998 | DeWitt et al. | |
| 5,716,584 A | 2/1998 | Baker et al. | |
| 5,863,507 A | 1/1999 | James | |
| 5,866,342 A * | 2/1999 | Antonenko et al. | 435/7.1 |
| 5,888,830 A | 3/1999 | Mohan et al. | |
| 5,961,925 A | 10/1999 | Ruediger et al. | |
| 5,985,356 A | 11/1999 | Schultz et al. | |
| 6,030,917 A | 2/2000 | Weinberg et al. | |
| 6,036,923 A | 3/2000 | Laugharn, Jr. et al. | |
| 6,045,755 A | 4/2000 | Lebl et al. | |
| 6,051,439 A | 4/2000 | Antonenko et al. | |
| 6,074,610 A | 6/2000 | Huang et al. | |
| 6,086,831 A | 7/2000 | Harness et al. | |
| 6,126,904 A | 10/2000 | Zuellig et al. | |
| 6,132,686 A | 10/2000 | Gallup et al. | |
| 6,191,398 B1 | 2/2001 | Peake et al. | |
| 6,274,094 B1 | 8/2001 | Weller, III et al. | |
| 6,306,658 B1 | 10/2001 | Turner et al. | |
| 6,401,519 B1 | 6/2002 | McFarland et al. | |
| 6,455,316 B1 | 9/2002 | Turner et al. | |
| 6,489,168 B1 | 12/2002 | Wang et al. | |
| 6,548,026 B1 | 4/2003 | Dales et al. | |
| 6,890,491 B1 | 5/2005 | Feygin et al. | |
| 2003/0156989 A1 | 8/2003 | Safir et al. | |

FOREIGN PATENT DOCUMENTS

| | | |
|---|---|---|
| DE | 43 16 163 A1 | 11/1994 |
| DE | 295 19 602 U1 | 5/1996 |
| DE | 298 06 957 U1 | 7/1998 |
| EP | 0 635 713 A1 | 1/1995 |
| FR | 2 630 927 A1 | 11/1989 |
| GB | 605517 | 10/1948 |
| JP | 4-18424 | 1/1992 |
| JP | 10-182501 | 7/1998 |
| JP | 11-165063 | 6/1999 |
| WO | WO 97/45443 | 12/1997 |
| WO | WO 98/03521 | 1/1998 |
| WO | WO 98/20965 | 5/1998 |
| WO | WO 00/09255 | 2/2000 |
| WO | WO 00/25925 | 5/2000 |
| WO | WO 00/29844 | 5/2000 |
| WO | WO 01/02089 A1 | 1/2001 |
| WO | WO 01/08800 A1 | 2/2001 |
| WO | WO 01/21302 A1 | 3/2001 |

OTHER PUBLICATIONS

Abstract for German Patent No. 43 16 163 A1, entitled *Method and Device for Evaporating Samples*, published Nov. 24, 1994, 1 page.

Abstract for Japanese Patent No. 4-18424, entitled *Batch Multistage Polymerization Apparatus*, published Jan. 22, 1992, 1 page.

Abstract for Japanese Patent No. 10-182501, entitled *Compound Automatically Synthesizing Apparatus and Sealing Structure for Reaction Tube Used Therefor*, published Jul. 7, 1998, 1 page.

Abstract for Japanese Patent No. 11-165063, entitled *Automatic Synthesizing Machine*, published Jun. 22, 1999, 1 page.

Andrews, et al., *Parallel Catalyst Screening Instrumentation*, HIMICA OGGI/chemistry today, Mar./Apr. 2001, 3 pages.

Buhlmann, et al., *An Open Software Environment to Optimize the Productivity of Robotized Laboratories*, J. Chromatogr. Sci. Jun. 1994, 243-248, vol. 32, No. 6.

Corkan, et al., *Application of an Automated Chemistry Workstation to Problems in Synthetic Chemistry*, Chemom. Intell. Lab. Syst. 1992, pp. 95-105, vol. 17.

Corkan, et al., *Design Concepts for Synthetic Chemistry Workstations*, Adv. Lab. Autom. Rob. 1990, pp. 477-497, vol. 6.

Corkan, et al., *Experiment Manager Software for an Automated Chemistry Workstation, Including a Scheduler for Parallel Experimentation*, Chemom. Intell. Lab. Syst.: Laboratory Information Management, Oct. 1992, pp. 47-74, vol. 17.

Gehrer, et al., *A Fully Programmable System for the Study of Catalytic Gas Reactions*, J. Phys. E. Sci. Instrum. 1985, pp. 836-838, vol. 18, No. 10.

Kiezel, et al., Chemia Stosowana [Applied Chemistry], *Comparative Semi-Micromethod of Studying Catalyst Activity*, 1968, pp. 407-415; XIL JA 107 (with translation).

Li, et al., *Mixing and Control of a CSTR with Series-Parallel Reactions*, J. Chin. Inst. Chem. Eng. 1991, pp. 61-69, vol. 22.

Lindsey, *A Retrospective on the Automation of Laboratory Synthetic Chemistry*, Chemom. Intell. Lab. Syst. 1992, pp. 15-45, vol. 17.

Nellesl, et al., *For Development of Test Reactors for Heterogenic Solid-Liquid-Processes*, Chem. Tech. 1975, pp. 714-716, vol. 27 (with translation).

Tietze, et al., *Temperature Oscillation Calorimetry in Stirred Tank Polymerization Reactors*, Dechema Monogr. 1995, 673-680, vol. 131.

* cited by examiner

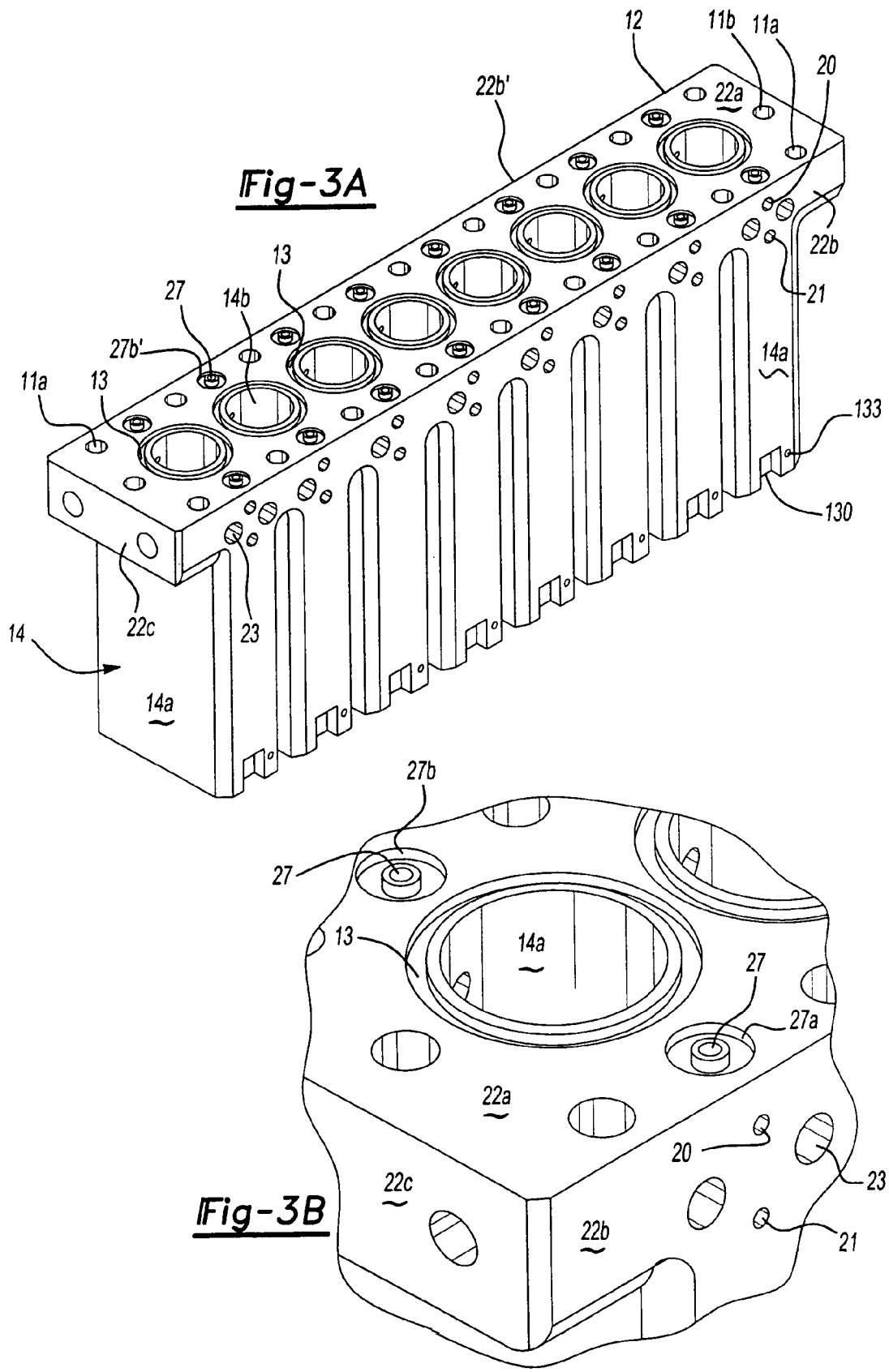

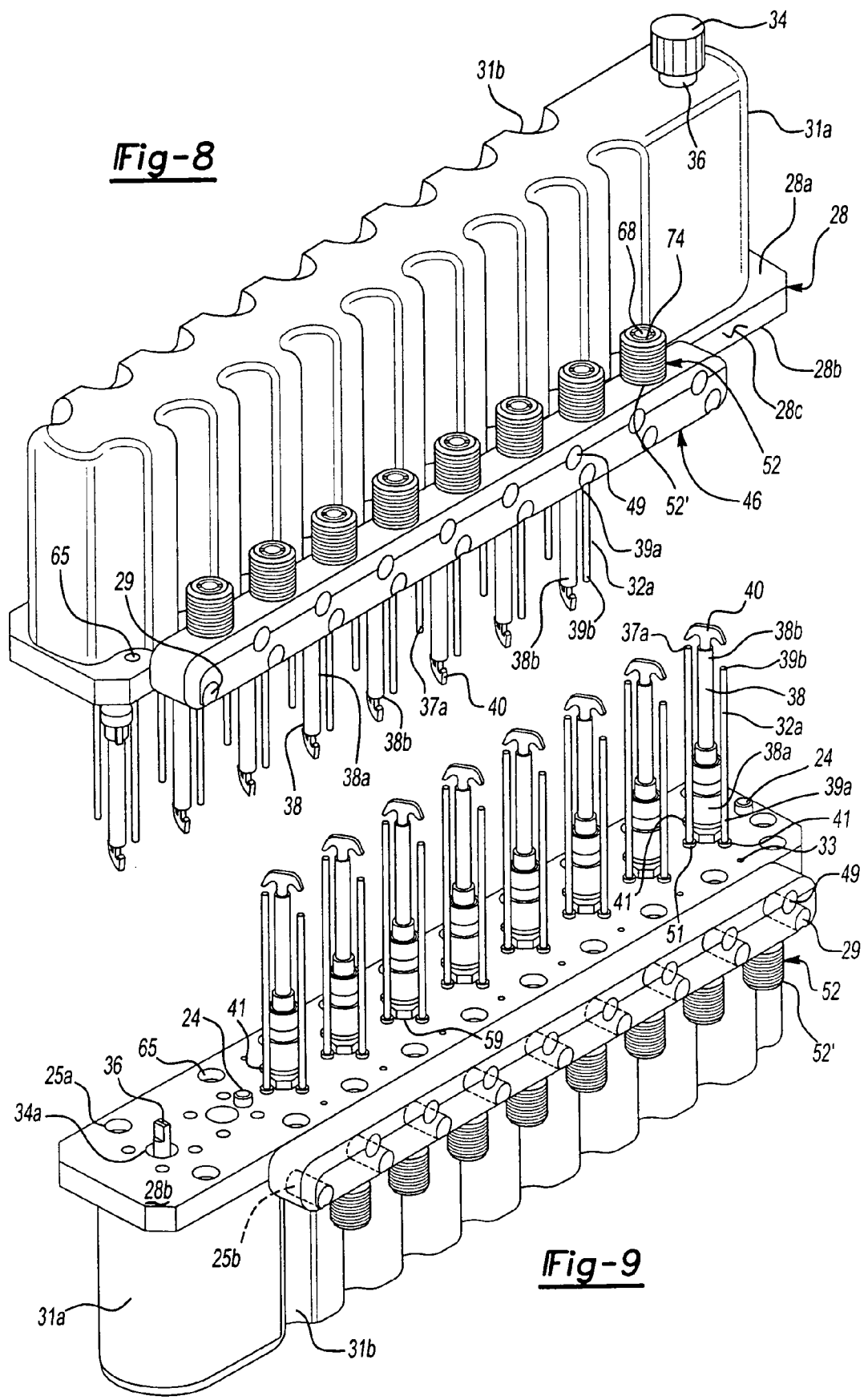

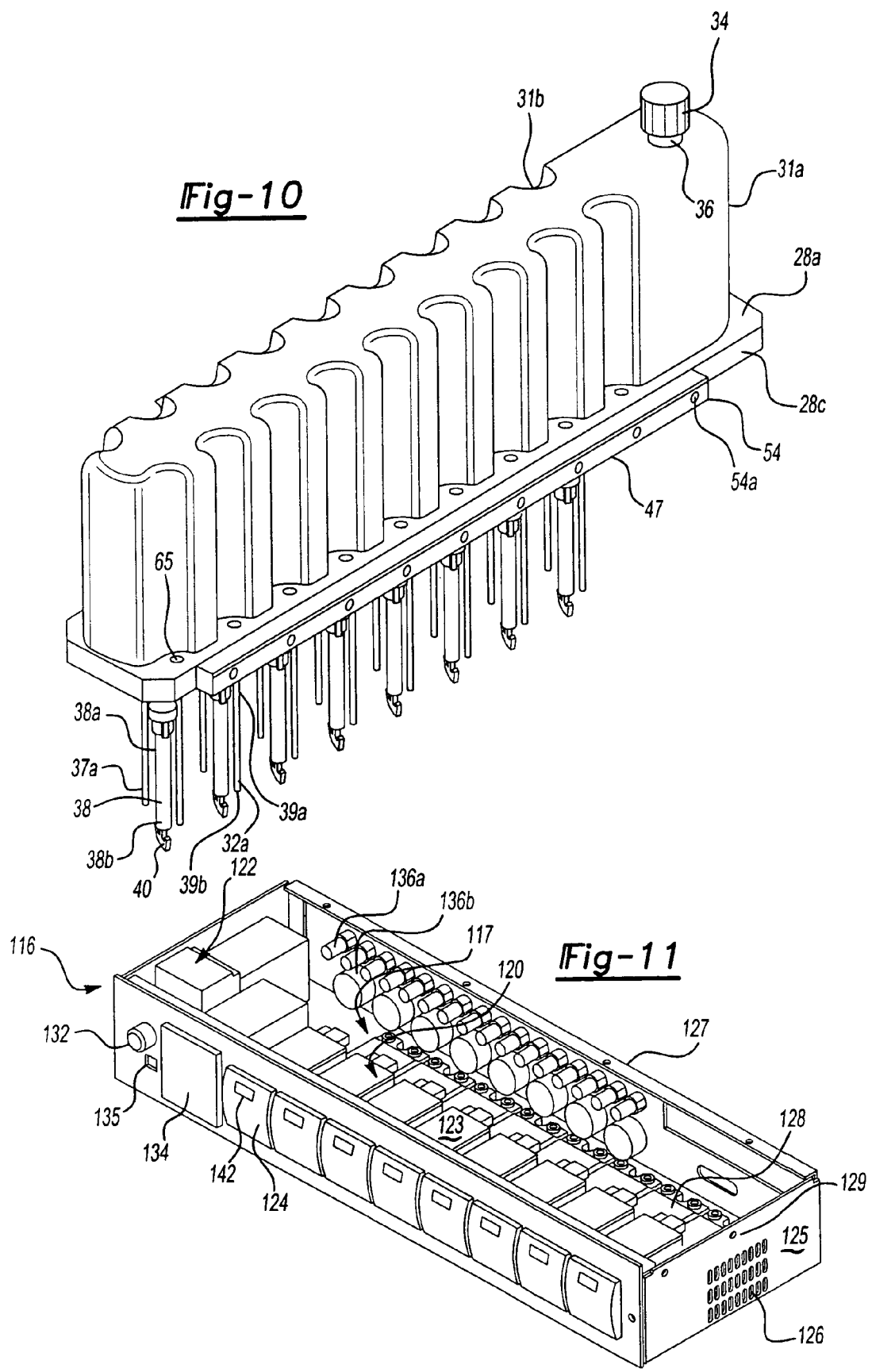

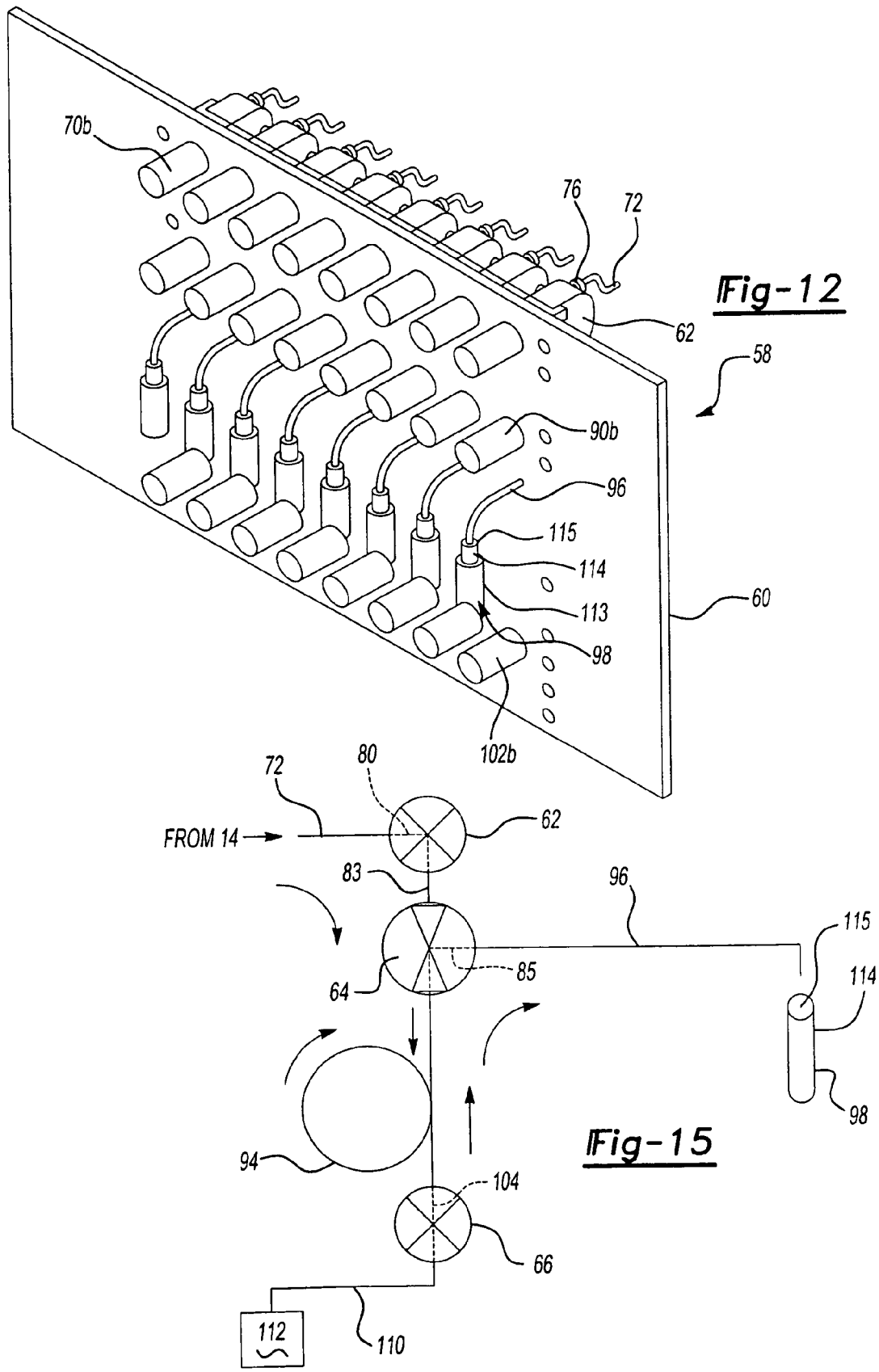

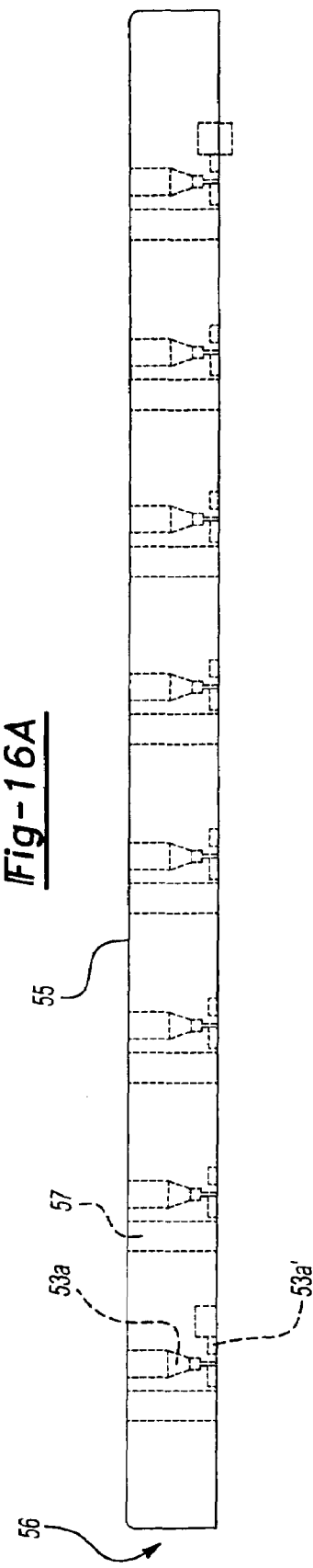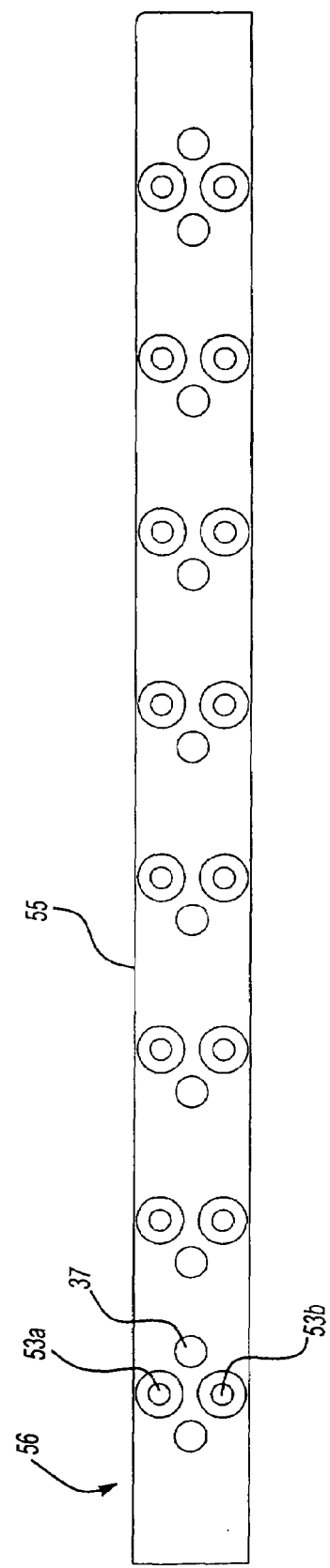
Fig-16A
Fig-16B

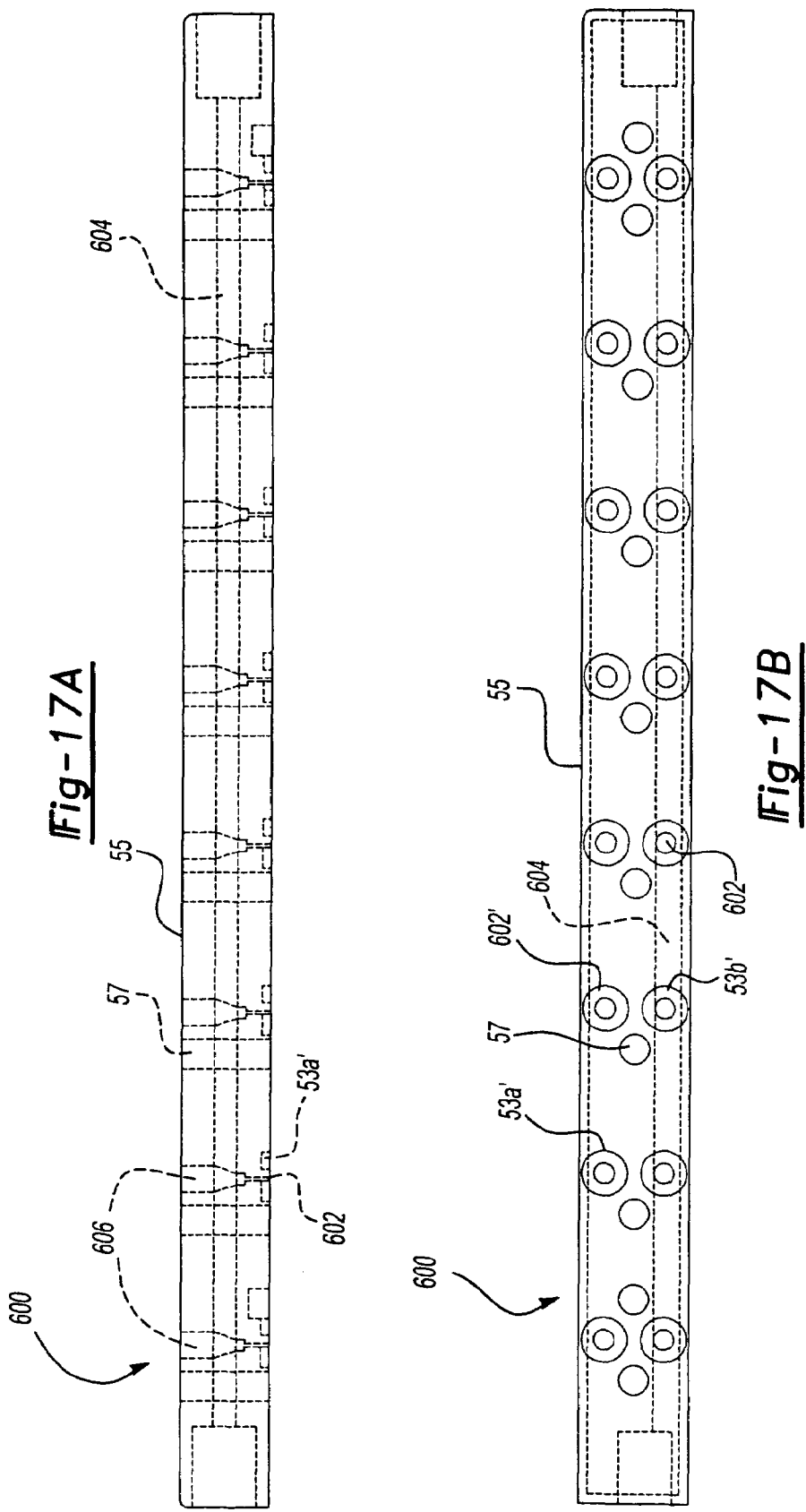

PARALLEL REACTOR FOR SAMPLING AND CONDUCTING IN SITU FLOW-THROUGH REACTIONS AND A METHOD OF USING SAME

The instant application is a division of U.S. patent application Ser. No. 09/826,606 filed Apr. 5, 2001 now U.S. Pat. No. 6,692,708.

FIELD OF THE INVENTION

The present invention relates to an apparatus and method for carrying out and in situ monitoring of the progress and properties of multiple parallel reactions.

BACKGROUND OF THE INVENTION

In combinatorial chemistry, a large number of candidate materials are created from a relatively small set of precursors and subsequently evaluated for suitability for a particular application. As currently practiced, combinatorial chemistry permits scientists to systematically explore the influence of structural variations in candidates by dramatically accelerating the rates at which they are created and evaluated. Compared to traditional discovery methods, combinatorial methods sharply reduce the costs associated with preparing and screening each candidate.

Combinatorial chemistry has revolutionized the process of drug discovery. One can view drug discovery as a two-step process: acquiring candidate compounds through laboratory synthesis or through natural products collection, followed by evaluation or screening for efficacy. Pharmaceutical researchers have long used high-throughput screening (HTS) protocols to rapidly evaluate the therapeutic value of natural products and libraries of compounds synthesized and cataloged over many years. However, compared to HTS protocols, chemical synthesis has historically been a slow, arduous process. With the advent of combinatorial methods, scientists can now create large libraries of organic molecules at a pace on par with HTS protocols.

Recently, combinatorial approaches have been used for discovery programs unrelated to drugs. For example, some researchers have recognized that combinatorial strategies also offer promise for the discovery of inorganic compounds such as high-temperature superconductors, magnetoresistive materials, luminescent materials, and catalytic materials. See, for example, co-pending U.S. patent application Ser. No. 08/327,513 "The Combinatorial Synthesis of Novel Materials" (published as WO 96/11878) and co-pending U.S. patent application Ser. No. 08/898,715 "Combinatorial Synthesis and Analysis of Organometallic Compounds and Catalysts" (published, in part, as WO 98/03251), which are all herein incorporated by reference.

Because of the success of the combinatorial approach in eliminating the synthesis bottleneck in drug discovery, many researchers have come to narrowly view combinatorial methods as tools for creating structural diversity. Few researchers have emphasized that, during synthesis, variations in temperature, pressure, ionic strength, and other process conditions can strongly influence the properties of library members. For instance, reaction conditions are particularly important in formulation chemistry, where one combines a set of components under different reaction conditions or concentrations to determine their influence on product properties.

In recent years, researchers have begun to design apparatus to be used in combinatorial experiments that allow parallel processing of multiple reactions, particularly where it is desirable to vary one or more parameters of the reactions. For instance, commonly assigned pending U.S. application Ser. No. 09/548,848 filed on Apr. 13, 2000, discloses a parallel reactor including vessels for containing a plurality of reaction mixtures, a stirring system, and a temperature control system adapted to maintain the individual vessels or groups of vessels at different temperatures. The Ser. No. 09/548,848 application is a continuation-in-part of pending U.S. application Ser. Nos. 09/239,223 and 09/211,982 filed Jan. 29, 1999 and Dec. 14, 1998, respectively, wherein the Ser. No. 09/211,982 application is a continuation-in-part of pending U.S. Ser. No. 09/177,170 filed on Oct. 22, 1998, which is itself a continuation-in-part of Provisional Application No. 60/096,603 filed Aug. 13, 1998, now abandoned, all of which are incorporated herein by reference.

Commonly assigned pending Provisional Application Ser. No. 60/255,716 filed on Dec. 14, 2000, incorporated herein by reference, also describes a related apparatus. In particular application Ser. No. 60/255,716 discloses parallel semi-continuous or continuous reactors for synthesizing combinatorial libraries of materials and screening combinatorial libraries of materials such as catalysts.

Given the growing interest in combinatorial research, it may be desirable to have a parallel reactor adapted to create various flow paths through the reactor block while allowing in situ monitoring and control over the progress and properties of multiple parallel reactions, as well as permit the removal of a portion of the reaction mixtures during the experiment or the performance of flow-through experiments, wherein both sampling and flow-through can occur without depressurizing or reducing the pressure in the respective reaction chambers.

SUMMARY OF THE INVENTION

The present invention relates to an apparatus and method for carrying out and in situ monitoring multiple parallel reactions. Specifically, the apparatus can be used for making, characterizing and sampling reaction mixtures, and can include a reactor block, reaction chambers, a stirring system, interchangeable manifolds and a sampling manifold assembly.

The reactor block can include reaction chambers for containing reaction mixtures under pressure. The reactor block can further include a first sidewall, a second sidewall, and a first plurality of fluid flow paths providing fluid communication with the first sidewall and respective reaction chambers and the second sidewall and respective reaction chambers.

In a preferred embodiment the first and second plurality of flow paths are channels formed through the reactor block and the base plate of the stirring system, respectively, and a group of four fluid flow paths from the first plurality of fluid flow paths are in fluid communication with a single reaction chamber. More specifically, two of the four fluid flow paths are defined by the first sidewall and two of the four fluid flow paths are defined by the second sidewall. And even more specifically, one of the two fluid flow paths defined by the first sidewall is in fluid communication with a respective reaction chamber reaction chamber via a respective flow path from the second plurality of flow paths, and one of the two fluid flow paths defined by the second sidewall is in fluid communication with a respective reaction chamber via one flow path of the second plurality of flow paths.

The stirring system can include a base plate defining a second plurality of flow paths. At least one flow path of the second plurality of flow paths is in fluid communication with respective reaction chambers, at least one fluid flow path of the first plurality of flow paths. The base plate supporting a plurality of stirring blade assemblies for mixing the reaction mixtures, wherein one stirring blade assembly of the plurality of stirring blade assemblies is received in the respective reaction chambers.

The interchangeable manifolds can be supported by the first sidewall and the second sidewall, and can define a plurality of manifold inlet/outlet ports. Each respective inlet/outlet port of the plurality of inlet/outlet ports is in communication with respective fluid flow paths of the first plurality of fluid flow paths and permits fluid to be introduced into or vented from the respective reaction chambers.

The interchangeable manifolds allow the first and second plurality of flow paths to be coupled in a variety of configurations. For instance, the plurality of inlet/outlet ports of the interchangeable manifold bars can define separate flow paths through the respective interchangeable manifold bars which align with respective flow paths through the reactor block or the base plate, respectively. For instance, a first group of inlet/outlet ports of the plurality of inlet/outlet ports can include inlet/outlet ports placed in fluid communication with respective flow paths of the first plurality of flow paths and respective flow paths of the second plurality of flow paths, wherein each inlet/outlet port of the first group is in fluid communication with respective flow paths of the first plurality of fluid flow paths and with respective flow paths of the second plurality of fluid flow paths. And, a second group of inlet/outlet ports selected from the plurality of inlet/outlet ports can be placed in fluid communication with respective flow paths of the first plurality of fluid flow paths, wherein the respective flow paths of the first plurality of fluid flow paths is in fluid communication with a head space defined within the respective reaction chambers, and wherein each inlet/outlet port of the second group is in fluid communication with a respective flow path of the first plurality of fluid flow paths.

Alternatively, the interchangeable manifolds can be set up to include a fifth group of inlet/outlet ports selected from the plurality of inlet/outlet ports. The inlet/outlet ports forming the fifth group are coupled in fluid communication so as to define a common flow path through the fifth group such that each inlet/outlet port of the fifth group is in fluid communication with separate flow paths forming the first plurality of fluid flow paths. Thus, each inlet/outlet port of this fifth group of inlet/outlet ports can be coupled to a common fluid or pressure source. Additionally, each inlet/outlet port of the fifth group of inlet/outlet ports can be placed in fluid communication with the respective reaction chambers.

In another embodiment, the parallel reactor can include a sampling manifold for allowing a sample to be withdrawn from the reaction chambers without depressurizing the reaction chamber or reducing the pressure in the reaction chamber. In a preferred embodiment, the sampling manifold assembly is coupled in fluid communication with the respective reaction chambers via at least one interchangeable manifold. For instance, a portion of the reaction mixture retained in the respective reaction chambers can be withdrawn from the respective reaction chamber through respective fluid flow paths of the first plurality of fluid flow paths and respective flow paths of the second plurality of flow paths, or both, without depressurizing or lowering the pressure in the respective reaction chamber.

A method of processing multiple reaction mixtures using the reactor 10 in can include the steps of (1) providing interchangeable manifolds having inlet/outlet ports in fluid communication with the respective reaction chambers, wherein a fluid can be introduced into or withdrawn from the respective reaction chambers; and (2) evaluating one or more properties of the reaction mixtures or a portion of the reaction mixture by measuring at least one characteristic of the reaction mixtures during at least a portion of the reaction. Additionally, the method could include the step of sampling a portion of the reaction mixture from the respective reaction chambers via at least one of the interchangeable manifolds, wherein sampling occurs at a pressure greater than ambient conditions and without reducing the pressure in the respective reaction chambers. And the step of providing the reaction chambers with starting mixtures can be performed by a robotic materials handling system or the starting materials could be manually added to the respective reaction chambers.

BRIEF DESCRIPTION OF THE DRAWINGS

The features and inventive aspects of the present invention will become more apparent upon reading the following detailed description, claims, and drawings, of which the following is a brief description:

FIGS. 3a–d show a front perspective view and a detailed view of the reactor block shown in FIG. 1.

FIG. 8 shows a perspective view of a stir top assembly that forms part of the parallel reactor shown in FIG. 1.

FIG. 9 shows a bottom perspective view of the stir top assembly shown in FIG. 8.

FIG. 10 shows an alternative embodiment of a stir top assembly formed in accordance with the teachings of this invention.

FIG. 11 shows a perspective view of the exterior and interior of the heater and motor control box shown in FIG. 1.

FIG. 12 shows a perspective view of a sampling manifold assembly that forms a part of the parallel reactor shown in FIG. 1.

FIG. 15 shows a schematic diagram showing a single flow path through the sampling manifold assembly shown in FIG. 12.

FIGS. 16a–b show a perspective view of a general use manifold assembly formed in accordance with the teachings of this invention.

FIGS. 17a–b show a perspective view of a flow-through manifold assembly formed in accordance with the teachings of this invention.

DETAILED DESCRIPTION OF THE PREFERRED EMBODIMENT

Figure 1:
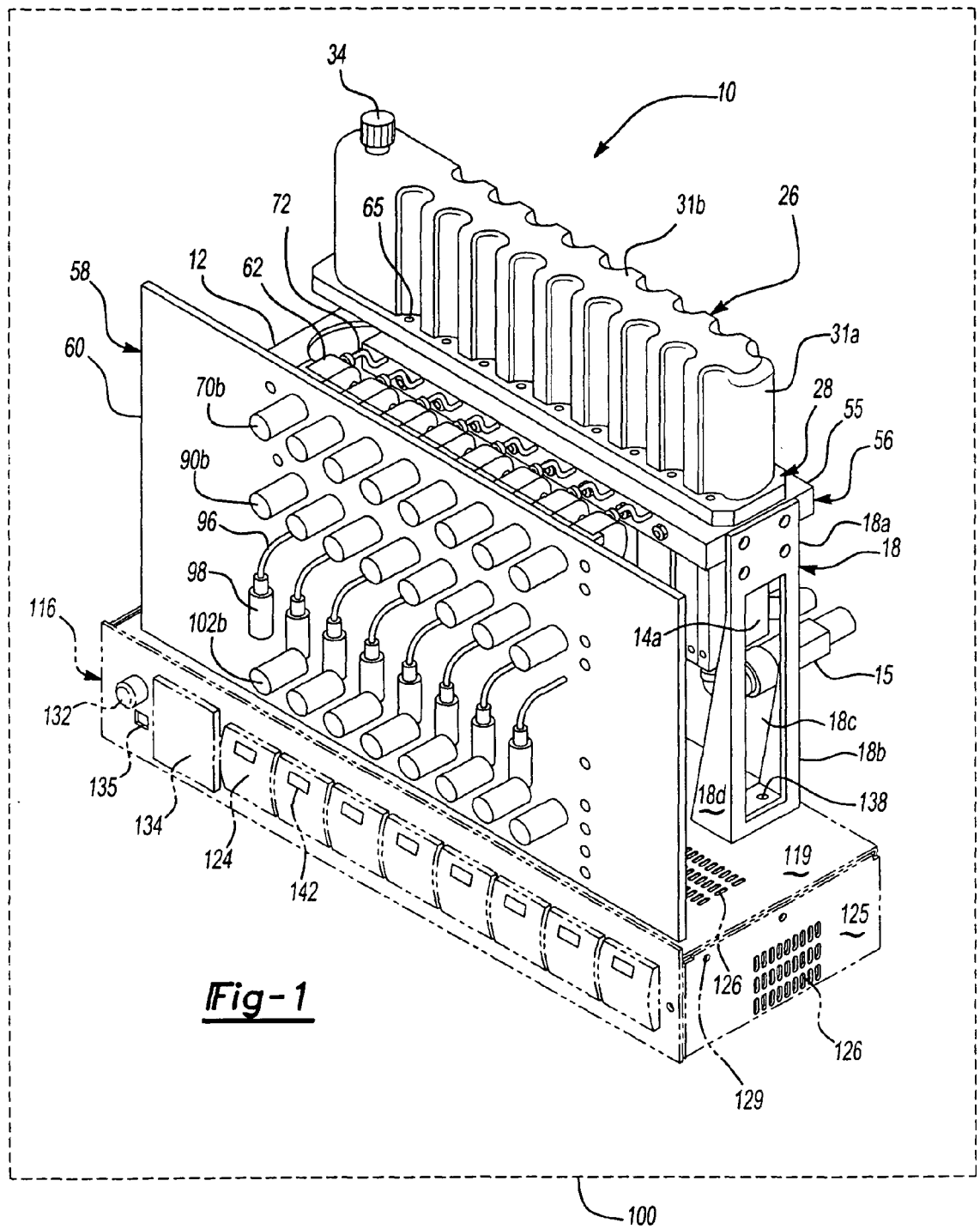
FIG. 1 shows a perspective view of a parallel reactor assembly formed in accordance with the teachings of the present invention.

The present invention is described herein with reference to the accompanying figures. Terms of reference such as "top" and "bottom" are used to facilitate an understanding of the present invention in view of the accompanying figures. The identified reference terms or other similar terms are not intended to be limiting, and one of ordinary skill in the art will recognize that the present invention can be practiced in a variety of spatial orientations without departing from the spirit and scope of the invention.

The apparatus comprising the present invention is particularly useful for the research and development of chemical reactions, catalysts and processes, and is especially useful for synthesizing, screening, and characterizing combinatorial libraries. The present invention provides an apparatus and method for carrying out and monitoring the progress and properties of multiple reactions in situ, and includes a reaction block assembly defining multiple reaction chambers.

The apparatus offers significant advantages over conventional experimental reactors. For example, the apparatus can provide in situ sampling of individual reaction mixtures and in situ injection of additional chemistry or components into one or more reaction chambers. Both in situ sampling and the injection of chemistry or other components can occur without depressurizing or lowering the pressure in the respective reaction chambers.

The present invention also permits the performance of flow-through experimentation, wherein flow-through experimentation can take place at pressures greater than atmospheric pressure, with an upper limit preferably set at 1500 psi. The present invention also permits continuous or semi-continuous flow-through experimentation.

Another advantage of the present invention is the ability to interchange manifold assemblies coupled to the reactor assembly so as to create various flow paths and flow patterns through the reactor block. The interchangeable manifolds permit opposing sides of the reactor block to be set up having identical or different flow path configurations.

Other advantages of the present invention result from the use of small volume mixtures. In addition to conserving valuable reaction mixtures, decreasing sample size increases surface area relative to volume within individual reaction chambers. This improves the uniformity of reaction mixtures, aids gas-liquid exchange in multiphase reactions, and increases heat transfer between the samples and the respective reaction chambers. Because large samples respond much slower to changes in system conditions, the use of small samples, along with in situ monitoring and process control, also allows for time-dependent processing and characterization.

Overview of Parallel Reactor

The parallel reactor system of the present invention is a modular platform for effecting combinatorial research in chemistry and materials science applications. Although the parallel reactor system of the present invention is designed to be a modular unit, the parallel reactor system can be designed for integration into a larger screening device as disclosed in commonly assigned U.S. application Ser. No. 09/548,848, the discussion of which is incorporated herein by reference.

The parallel reactor includes a plurality of reaction chambers that can be operated in parallel on a scale suitable for research applications, typically bench scale or smaller scale (e.g., mini-reactors and micro-reactors). The reaction chambers of the parallel reactor can typically, but not necessarily, be formed in, be integral with or be linked by a common substrate, be arranged in a common plane, preferably with spatial uniformity, and/or can share a common support structure or housing.

The same or different reactions (experiments) may be performed in each well. Thus, each reactor well may vary with regard to its contents during an experiment. Each reactor well can also vary by a process condition, including catalyst amounts (volume, moles or mass), ratios of starting components, time for reaction, reaction temperature, reaction pressure, rate of reactant addition to the reaction, reaction atmosphere, injection of a catalyst or reactant or other component (e.g., a reaction quencher) and other conditions that those of skill in the art will recognize. Each reaction chamber can also vary by the chemicals present, such as by using different reaction mixtures or catalysts in two or more reaction chambers.

The parallel reactor is also designed to permit separate agitation of each sample by stirring the reaction mixtures in the respective well at selected times during the experiment without depressurizing or lower the pressure of the reactor well. The parallel reactor also permits the injection of additional chemistry into a desired well at selected times during the experiment. Further still, the parallel reactor is designed to allow the real-time collection of samples under pressure from each well at any time during an experiment. Finally, the parallel reactor also permits the performance of flow-through reactions continuously or at selected times during the experiment.

FIG. 1 shows one embodiment of a parallel reactor system 10 formed in accordance with the teachings of this invention. The reactor system 10 can include a reactor block assembly 12, a stir top assembly 26, a manifold assembly 56, a sampling manifold assembly 58, and a heater and motor control box 116.

The Reactor Block

FIGS. 1-4 show a reactor block 12 formed in accordance with the teachings of this invention. As best seen in FIGS. 3a–d, the reactor block 12 includes a rectangularly shaped body including a top surface 22a, opposing sidewall surfaces 22b, 22b' and opposing end surfaces 22c. The reactor block 12 can be fabricated using a metal, glass/quartz/ceramic or plastic material. Preferably, the reactor block 12 is fabricated of stainless steel; however, one of skill in the art will appreciate that materials having similar chemical or mechanical properties could be used. One of skill in the art will also appreciate that the reactor block 12 can be formed using other configurations or shapes.

The reactor block 12 defines a plurality of reaction chambers in the form of reactor wells 14 for receiving and retaining the reaction mixtures. As best illustrated in FIGS. 3a–c and 4, the reactor block 12 defines eight reactor wells 14 formed in the reactor block 12 using known machining or metal working techniques. One of skill in the art will appreciate that the reactor block 12 could be designed to include any desired number of reactor wells 14.

Each well 14 defines a rectangularly shaped body 14a that projects downwardly from the top surface 22a. Each body 14a is separated from an adjacent body 14a by an air gap such that each reactor well 14 defines a separate reaction chamber that can be used to perform the same or different experiments in parallel. The air gap also thermally isolates adjacent well bodies 14a, which helps improve the efficiency of the parallel reactor system 10.

Figure 6:
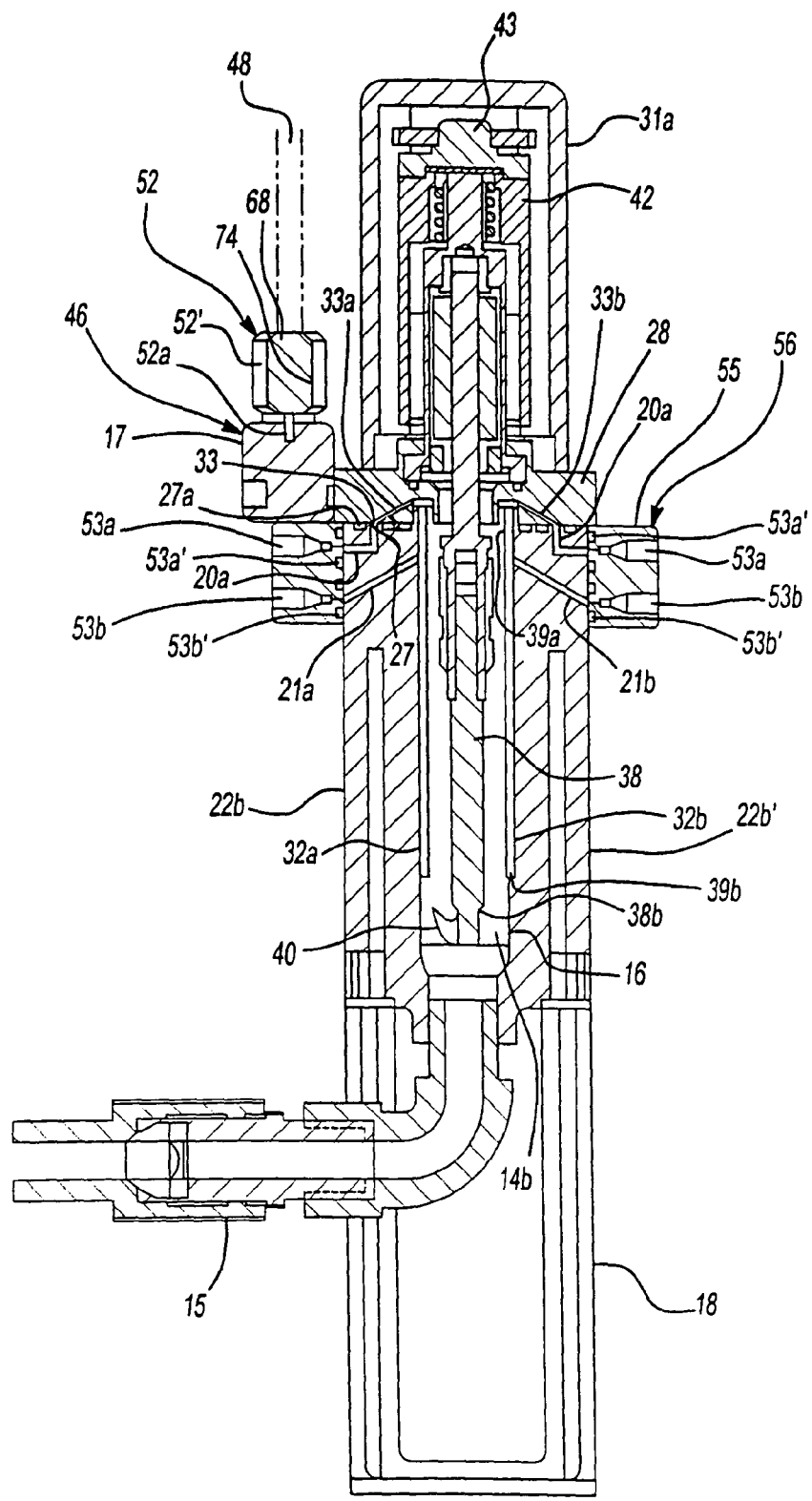
FIG. 6 shows a section view of the parallel reactor shown in FIG. 2a taken along the line 6—6.

Referring back now to FIGS. 2c and 6, the bottom surface 140 of the well body 14a is coupled to a pressure control valve 15. In the disclosed embodiment, the surface 140 supports threads for mating with a standard burst disk supporting mating threads, as best seen in FIG. 6. One of skill in the art will appreciate that other types of pressure control devices could be used, and that other known methods can be used to install such devices.

Referring now to FIGS. 3a, b and 6, each reactor well body 14a includes an open center 14b. The open center 14b can extend downwardly through at least a portion of the body 14a. As shown in FIG. 3a, the open center 14b can originate at the top surface 22a, wherein it is surrounded by an O-ring interface 13, and continue through the body 14a terminating at the bottom surface 140.

The open centers 14b can be sized such that the volume retained by each reactor well 14 can be the same or different. The volume of each reactor well 14 may vary from about 0.1 milliliter (ml) to about 500 ml, more particularly from about 1 ml to about 100 ml and even more particularly from about 5 ml to about 20 ml. These well 14 sizes allow for reaction mixture volumes in a range that functionally allow for proper agitation of the sample by stirring (e.g., a 15 ml reactor vessel allows for reactant volumes of between about 2–10 ml). Also, the parallel reactor 10 allows the pressure to vary from reactor well 14 to reactor well 14, with each reactor well 14 being pressurized to a positive pressure, wherein the upper pressure limit can be equal to or greater than 1500 psi, with the preferred upper limit set at 1500 psi. Additionally, the reactor temperature can vary from reactor well 14 to reactor well 14, with each reactor well 14 generally operating at a maximum temperature of about 250° C. In will be appreciated that the reactor 10 could be designed to operate at temperatures and pressures above or below the aforementioned values.

Figure 2A:
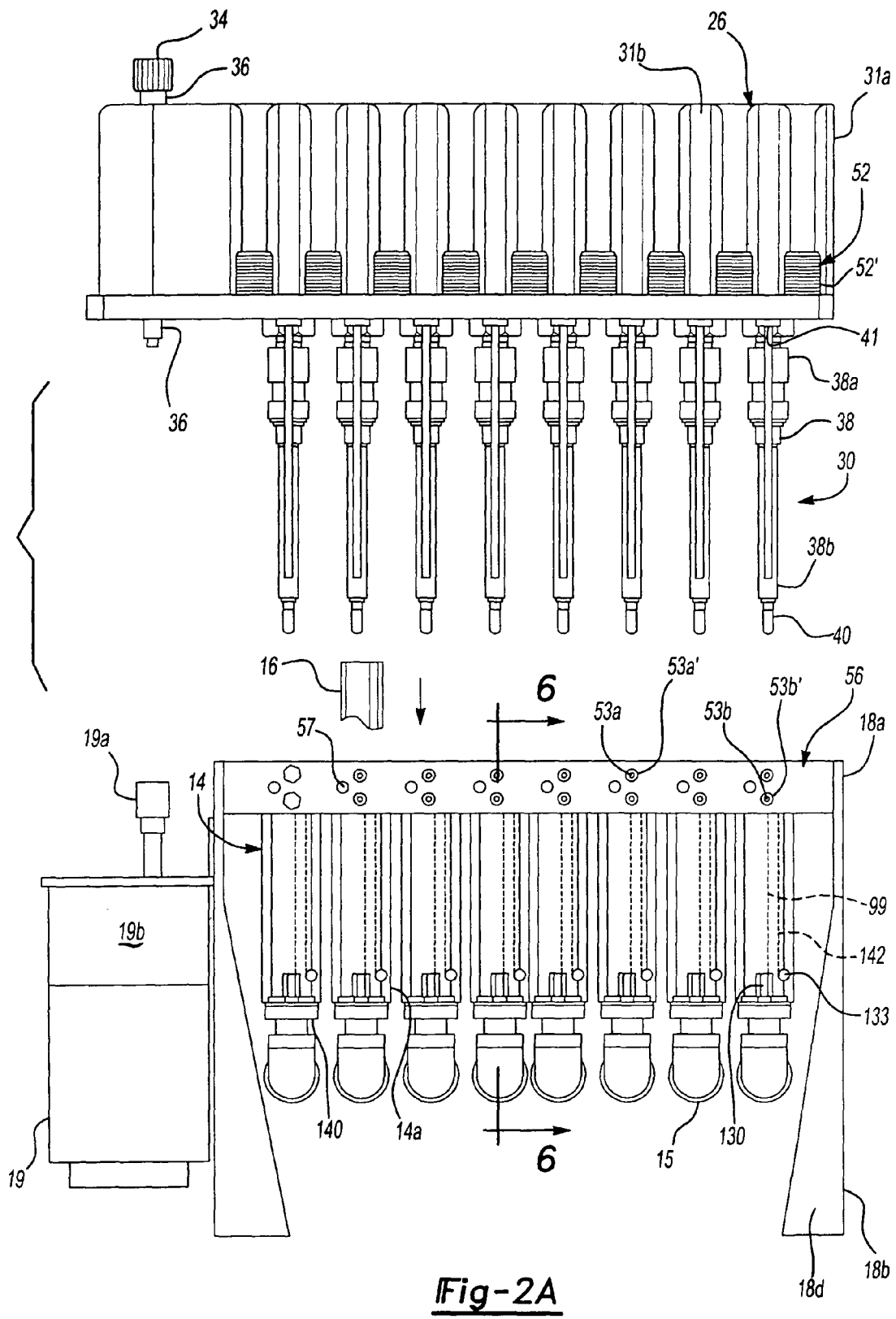
FIGS. 2a–c show a rear, top and side view of the parallel reactor block assembly shown in FIG. 1.
Figure 5:
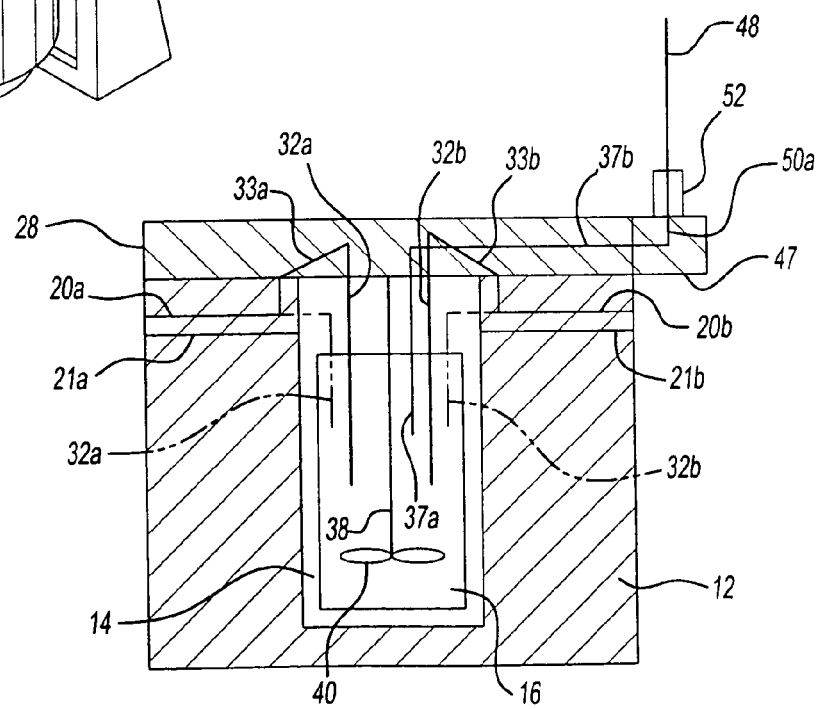
FIG. 5 shows a section view of one reactor well (reaction chamber) of the parallel reactor shown in FIG. 1.

As shown in FIGS. 2a and 5, each open center 14b can receive and support a closed bottom removable vessel 16 into which the reaction mixtures can be received. As best seen in FIGS. 2a and 5, the vessels 16 can include a diameter sized to be received within each of the respective reactor wells 14, and, preferably, the closed bottom of the vessel 16 is continuous with the bottom surface 140 of the well body 14a.

The vessels 16 can include a length that is shorter than the length of the reactor well 14, as best seen in FIG. 5. As a result, the upper end of the removable vessels 16 is not contiguous with the top surface of the well 14, since the top surface of the reactor well terminates at the top surface 22a. This arrangement defines a head space 17 above the vessels 16 (or the reaction mixture) that allows mixing or stirring the reaction mixtures within the well 14/vessel 16.

When using the removable vessels 16, one can select vessels 16 made of a material appropriate for a given set of reaction mixtures, products, and reaction conditions. For instance, the removable vessels 16 can be glass, plastic or Teflon® test tubes or vials sized so that a vessel 16 fits within the open center 14b of a single reactor well 14. The removable vessels 16 can also be liners fabricated of a polymer material, wherein the liners cover at least a portion of the open center of the respective reactor wells 14, providing a protective covering over at least a portion of the interior surface of the reactor well 14.

Although the reaction mixtures could be received directly by the well 14 in the respective openings 14b, the removable vessels 16 can provide several advantages. For example, the vessels 16 prevent the reaction mixtures from coming into direct contact with the reaction block 12, as such contact could be the source of contaminants in subsequent experiments. Unlike the reactor block 12, which represents a significant investment, the vessels 16 can be discarded if damaged after use. Furthermore, the vessels 16 permit removal of one or more vessels 16 from the reactor block 12 for further in-depth characterization at various times during the experiment. Finally, one can lower material costs and ensure compatibility with standardized sample preparation and testing equipment by designing the reactor block 12 to accommodate commercially available vessels 16.

Figure 3C:
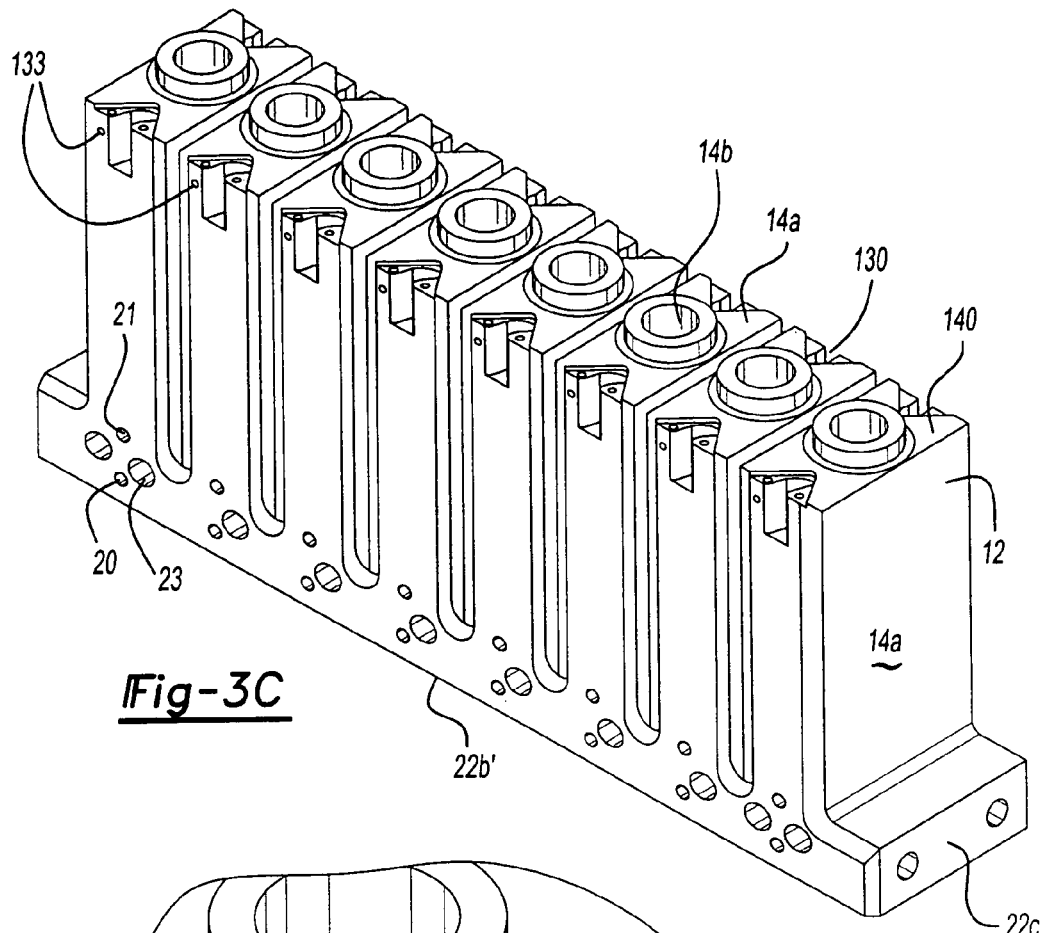

In addition to the reactor wells 14, the reactor block 12 is configured to support or retain various components. Referring to the top surface 22a as shown in FIGS. 3a–d, the top surface 22a defines a plurality of mounting holes 11a along a portion of the length thereof for receiving threaded fasteners such as screws or bolts. The top surface 22a also defines one or more smaller openings 11b for receiving a locating pin, for example, a dowel pin for aligning the reactor block 12 with a mating component. As best seen in FIGS. 3a, 4, the openings 11b can be centrally located at opposite ends of the reactor block 12 along the width of the surface 22a.

FIG. 4 also shows a pair of openings 27. The openings 27 are formed along opposing edges of the top surface 22a using known machining techniques such that openings 27 are in fluid communication with respective paths 20a, 20b (discussed in more detail below). As best seen in FIG. 3b, each opening 27 is surrounded by a respective O-ring interface 27a, 27b, wherein the O-ring interfaces 27a, 27b are formed in the surface 22a using known machining or metal working techniques.

Referring now to FIGS. 3a and 4, the opposing end surfaces 22c are substantially planar and include a plurality of threaded openings for receiving threaded fasteners such as bolts or screws. Each end surface 22c supports a leg 18, as best seen in FIGS. 1, 2a, 2c and 4.

Figure 2B:
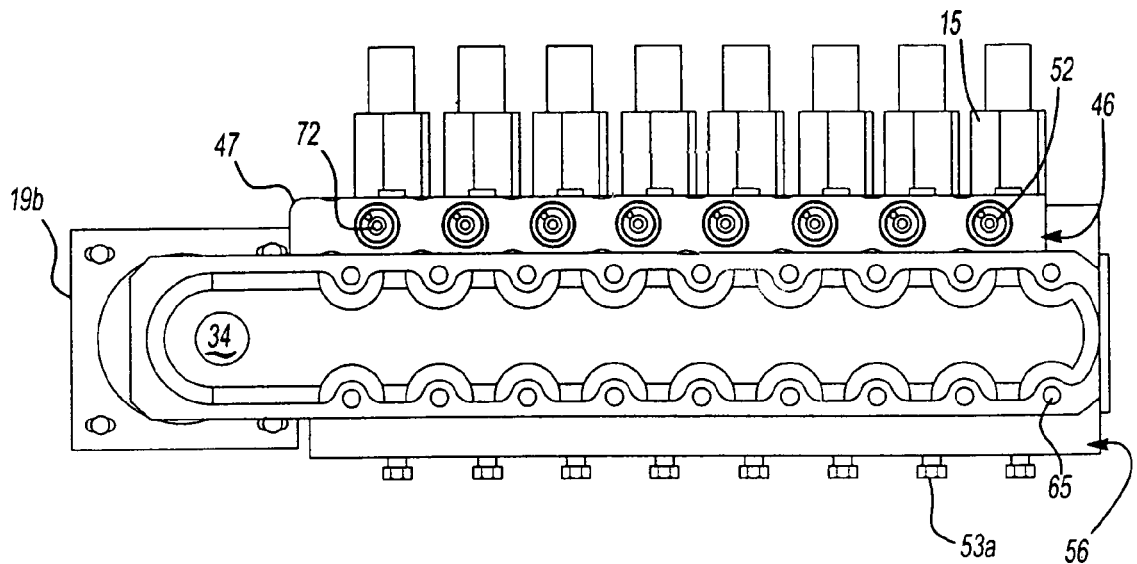
Figure 2C:
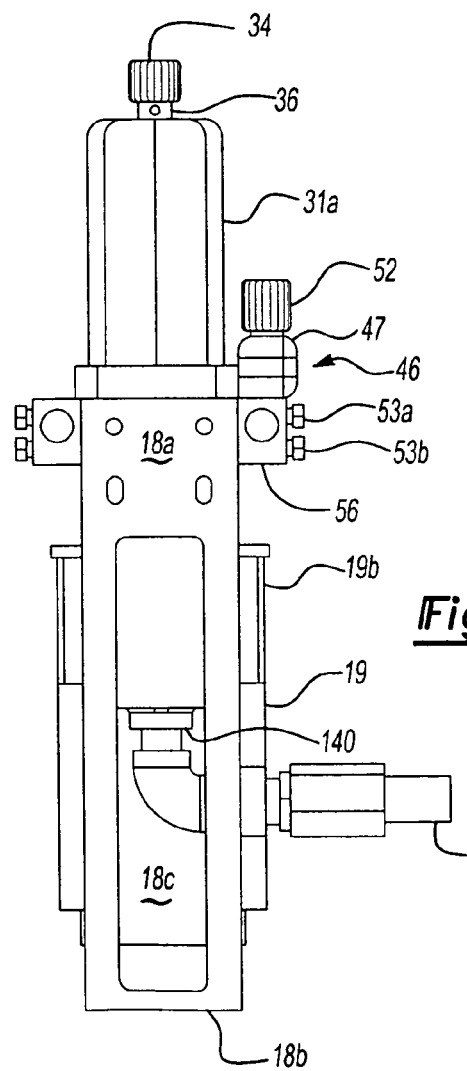

As shown in FIG. 2c, each leg 18 is a rectangularly shaped member, and defines an open center 18c that extends along a portion of the length of the leg 18, a first end 18a and a second end 18b. It will be appreciated that the leg 18 can be configured having a different geometrical shape.

The first end 18a includes a substantially planar solid surface that includes a plurality of openings for receiving threaded fasteners. The first end 18a acts as a mounting bracket for coupling the leg 18 to the reactor block at the opposing ends 22c. As best seen in FIG. 4, the legs 18 can be coupled to the opposing ends 22c by inserting threaded fasteners into aligned threaded openings defined by both the ends 22c and the legs 18. Alternatively, the legs 18 could be integrally formed with the end surfaces 22c or coupled to the end surfaces 22c using welding techniques or other similar methods.

The open center 18c of each leg 18 is contiguous with the first end 18a and extends through the leg 18 to the second end 18b. At the second end 18b the leg 18 defines a triangularly shaped surface area 18d that projects outwardly from the second end 18b. The triangularly shaped surface area 18d defines a foot upon which the leg 18 stands. Each leg 18, particularly the triangularly-shaped surface area 18c, is configured to impart stability to the reactor block 12, allowing the reactor block 12 to stand alone independent of other supporting devices. Alternatively, the foot includes openings 138 for receiving fasteners such as screws or bolts for coupling the leg 18 to a mating component.

As best seen in FIG. 4, one leg 18 supports a motor 19. The motor 19 can be coupled to the leg 18 via a standard mounting bracket 19b using threaded fasteners or other similar devices, wherein the mounting bracket 19b includes a closed sidewall surface and an open top and bottom. Also, as best seen in FIG. 4, the motor 19 includes an outwardly extending motor shaft 19a. In the disclosed embodiment, the motor 19 is a brushless AC drive motor, although other types of motors could be used such as an air-driven motor, a DC stepper motor or other known AC or DC motors, including variable or constant speed motors.

Figure 3D:
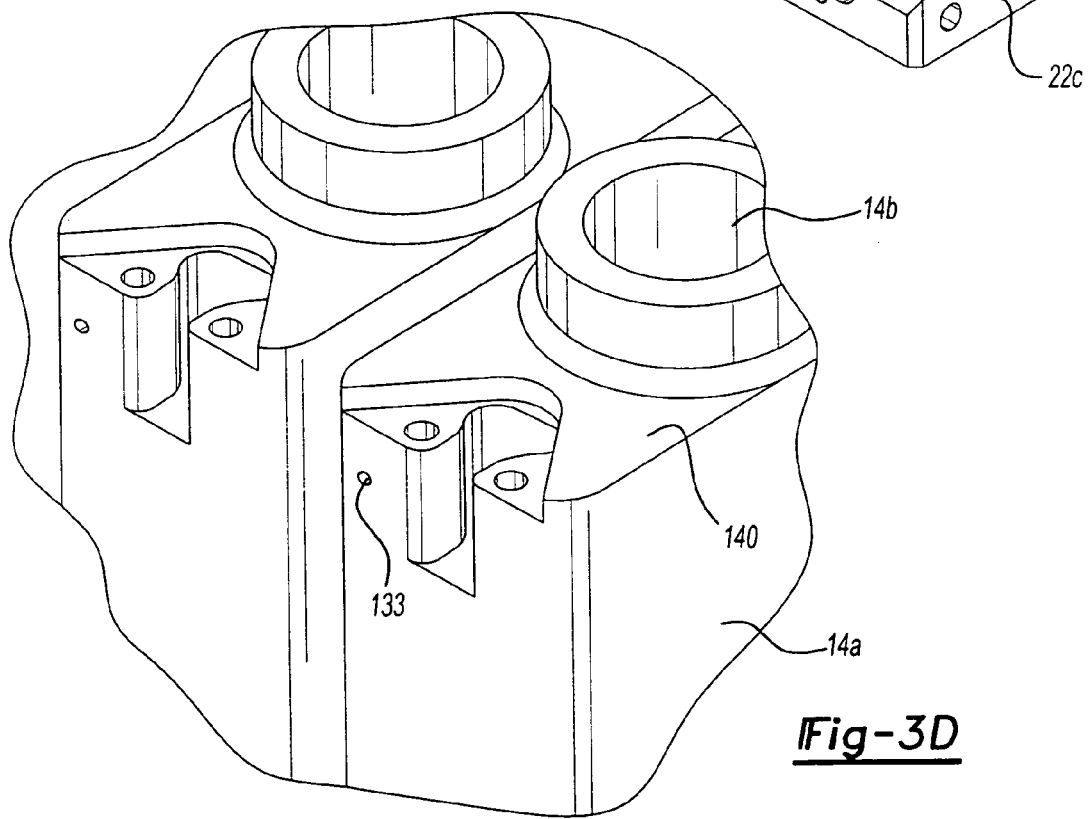
Figure 4:
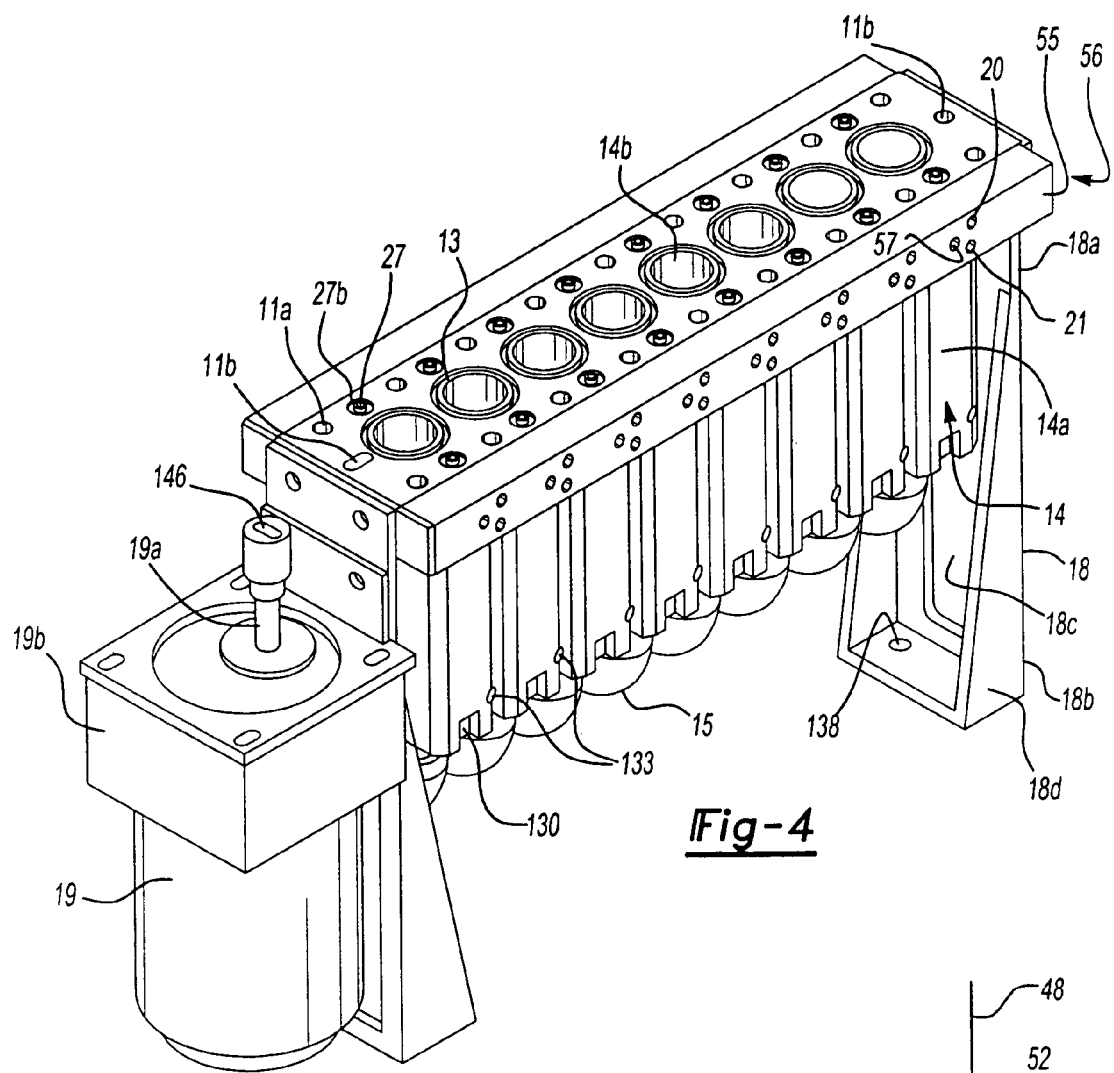
FIG. 4 shows a rear perspective view of the parallel reactor block assembly shown in FIG. 1.

Turning now to a discussion of the opposing sidewall surfaces 22b, 22b', as best seen in FIGS. 3a–d, each opposing sidewall surface 22b, 22b' defines a plurality of threaded holes 23 along the length of the sidewall surface 22b, 22b' for receiving threaded fasteners. Additionally, each sidewall surface 22b, 22b' defines an opening 20 as best seen in FIG. 3d. Each opening 20 can be machined in the respective sidewall 22b, 22b' using known machining techniques, and is configured to permit passage of a fluid, wherein the fluid can be either a liquid or gas, through though the sidewall 22b, 22b', respectively.

Figure 7:
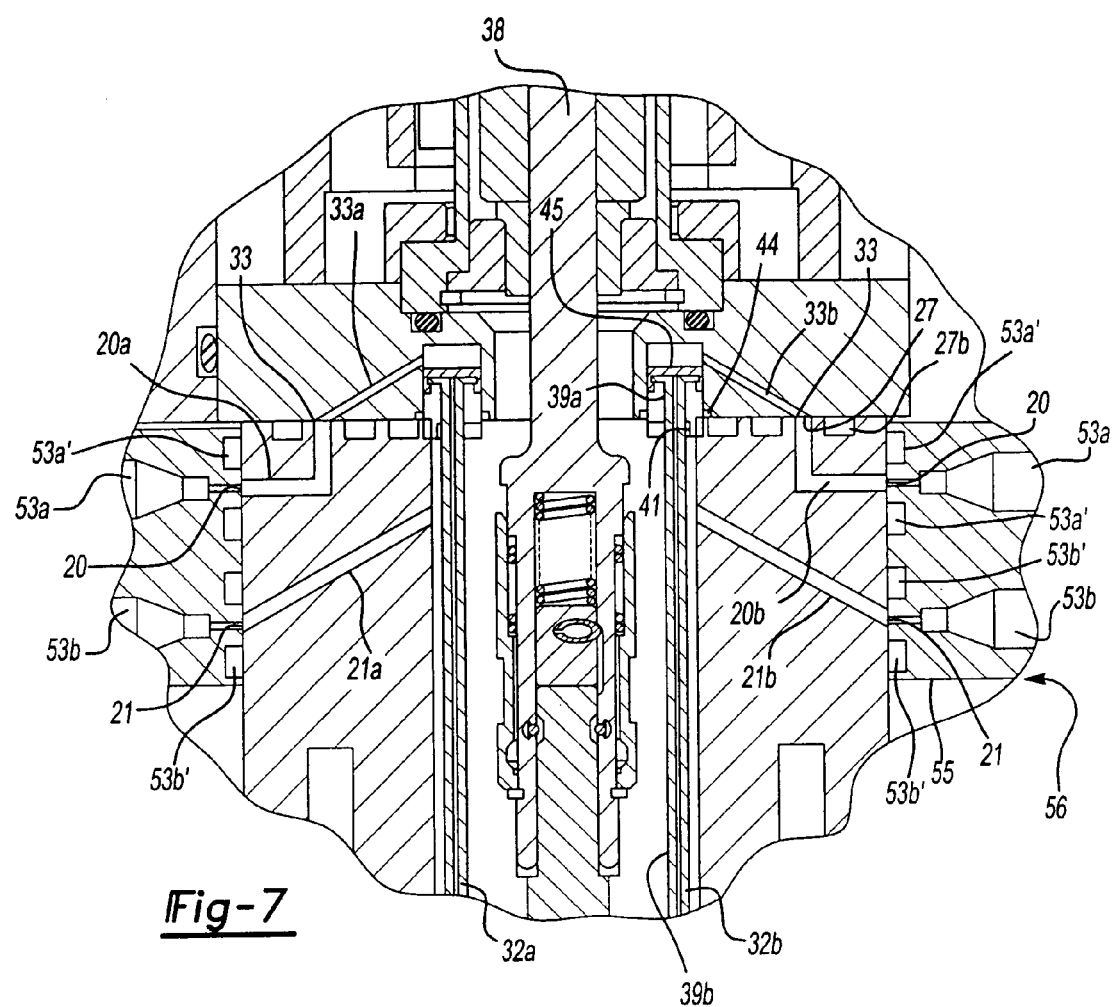
FIG. 7 is a detail view of the structure shown in FIG. 6, showing the internal flow paths through the parallel reactor.

As best seen in FIG. 7, each opening 20 is in fluid communication with a separate fluid flow path 20a, 20b defined through the reactor block 12 through the respective sidewalls 22b, 22b. And each fluid flow path 20a, 20b establishes fluid communication with a respective well 14, as will be described in more detail below. In the embodiment shown in FIG. 7, each flow path 20a, 20b extends through a portion of the respective sidewall surface 22b, 22b' in the direction of the well 14. However, prior to intersecting the well 14, each flow path 20a, 20b turns approximately 90° and terminates at the top surface 22a adjacent a respective opening 27, as shown in FIGS. 5 and 7. This arrangement establishes fluid flow paths 20a, 20b through at lest a portion of the respective sidewall surface 22b, 22b'.

Each flow path 20a, 20b can be formed through the respective sidewall 22b, 22b' using knowing machining techniques. And it will be appreciated that the flow paths 20a, 20b could be machined so as to extend through the entire width of the respective sidewall 22b, 22b' and caused to provide fluid communication directly with the well 14 as shown by the phantom lines in FIG. 5. Furthermore, it will be appreciated that other known techniques could be used to establish the respective flow paths 20a, 20b through the reactor block 12.

Referring back to FIGS. 3d and 7, each sidewall surface 22b, 22b' defines a second opening 21 positioned vertically below the opening 20. Each opening 21 can be machined in the respective sidewall 22b, 22b' using known machining techniques. It will be appreciated that other techniques could be used to form each opening 21.

Each opening 21 is adapted to permit the passage of a fluid, preferably a gas, through the respective sidewall 22b, 22b', consequently, the opening 21 is also referenced to as a gas port. As best seen in FIG. 7, each opening 21 is in fluid communication with separate fluid flow paths 21a, 21b defined through the reactor block 12 through the respective sidewall surfaces 22b, 22b'. The pair of fluid flow paths 21a, 21b can be machined through the respective sidewall surface 22b, 22b' using known techniques, and caused to terminate at opposite sides of the inner surface of a single reactor well 14, as best shown in FIGS. 5 and 7. This arrangement not only results in the terminal end of each flow path 21a, 21b being in fluid communication with opposite sides of the interior of a respective well 14, this arrangement establishes fluid communication between each flow path 21a, 21b and the head space 17, as best seen in FIG. 5. Consequently, each flow path 21a, 21b can be separately vented to the head space 17.

Reactor Block Manifold Assemblies

The reactor block manifold assemblies allow one or more fluids, liquid or gas, to be introduced into, withdrawn from or vented through the reactor wells 14. For instance, the reactor block manifold assemblies can include fluid flow paths that provide fluid communication between the respective wells 14 and the manifold assembly. The manifold flow paths can be configured to permit selective control over the manner in which fluid is introduced into, withdrawn from or vented through the wells 14. For instance, each inlet/outlet port of the manifold assemblies can be separately coupled to a respective well 14 and one or more fluid sources, the inlet/outlet ports can be coupled to the respective wells 14 so as to create a common flow path to one or more of the wells 14, or certain flow paths can be plugged to prevent flow through the respective flow path. Even further still, the reactor block manifold assemblies can include components such as check valves or other flow control valves that permit selective control over the fluid flow paths between a particular manifold assembly and the respective wells 14.

As best seen in FIG. 4, the reactor block 12 can support a general use manifold assembly 56 to establish a variety of fluid flow patterns through the reactor block 12. The manifold assembly 56 can include a pair of metal elongated bars 55, the bars preferably being stainless steel.

As best seen in FIGS. 4 and 16b, each manifold bar 55 can be identically formed so as to include a plurality of axially aligned inlet/outlet port pairs 53a, 53b formed along the length thereof. As shown in FIGS. 7 and 16a, b, the manifold bar 55 includes sixteen separate inlet/outlet ports 53a, 53b, each inlet/outlet port 53a, 53b establishing a flow path through the manifold bar 55.

As best seen in FIG. 7, the inlet/outlet ports 53a, 53b can support a standard fitting (not shown), and can be sized and configured to receive a conduit or other vessel for transferring fluids into or out of the separate wells 14 or vessels 16. Each inlet/outlet port pair 53a, 53b is surrounded by an O-ring interface 53a', 53b', respectively. As best seen in FIG. 7, O-ring interface 53a' is associated with inlet/outlet port 53a, and O-ring interface 53b' is associated with inlet/outlet port 53b. It will be appreciated that openings 53a, 53b and O-ring interfaces 53a', 53b' can be formed in the manifold bar 55 using known machining or metal working techniques.

Referring back to FIGS. 4 and 16b, the manifold bar 55 can also include a plurality of openings 57 for receiving threaded fasteners such as screws or bolts for coupling the respective manifold bar to the reactor block 12. As shown in FIG. 7, each manifold bar 55 is supported by the respective sidewall surface 22b, 22b' such that separate manifold inlet/outlet ports 53a, 53b align with and are in fluid communication with respective openings 20 and 21. This arrangement permits fluid communication between respective inlet/outlet ports 53a, 53b and a single well 14.

As best seen in FIG. 7, when a manifold bar 55 is coupled to the reactor block 12 at sidewall 22b, each inlet/outlet port 53a, 53b is placed in fluid communication with respective openings 20 and 21 so as to establish fluid communication with respective flow paths 20a, 21a. And if a second manifold bar 55 is coupled to sidewall 22b', each inlet/outlet port 53a, 53b is placed in fluid communication with respective openings 20 and 21 so as to establish fluid communication with respective flow paths 20b, 21b. This arrangement permits separate fluid flow paths to be established through each of flow path 20a, 20b, 21a, and 21b.

While the general use manifold 56 provides great flexibility in how the reactor block 12 can be configured to receive or vent fluids, the general manifold 56 requires the use of at least 32 lines or connections to establish fluid communication between each of the 32 manifold inlet/outlet ports 53a, 53b and each respective opening 20, 21.

Flow-Through Manifold

In another embodiment, the general use manifold assembly 56 can be configured as a flow-through manifold 600, as shown in FIGS. 17a, b. It will be appreciated that the general use manifold assembly 56 and the flow-through manifold 600 share common elements. Thus, common reference numerals are used to describe common features. Flow-through occurs when a fluid, preferably a gas, is received in one or more reactor wells 14 through the respective flow paths 20a, 20b and vented out through one or more other inlet/outlet ports in fluid communication with the respective well 14.

As best seen in FIGS. 17a, 17b, the flow-through manifold 600 is substantially identical to the general use manifold assembly 56, and thus can include an elongated stainless steel manifold bar 55. The manifold bar 55 can include a plurality of inlet/outlet port pairs 602, 602', wherein the inlet/outlet ports 602, 602' are formed in the manifold bar 55 using known machining techniques. The inlet/outlet ports 602, 602' are each surrounded by an O-ring interface 53a', 53b'.

As best seen in FIGS. 17a, b, the flow-through manifold 600 differs from the general use manifold 56 in that each inlet/outlet port 602 can be joined in fluid communication so as to create a common flow path 604 through the manifold bar 55, while each inlet/outlet port 602' defines separate flow paths 606 through the manifold bar 55 as best seen in FIG. 17a.

When a single flow-through manifold bar 55 is coupled to the reactor block 12 at sidewall surface 22b, each inlet/outlet port 602 aligns with a single opening 20 so as to establish a common fluid flow path 604 between each inlet/outlet port 602 and each flow path 20a. And each inlet/outlet port 602' aligns with separate openings 21, establishing fluid communication with the associated flow path 21a.

If a second flow-through manifold bar 55 is coupled to sidewall surface 22b', each inlet/outlet port 602 aligns with a single opening 20 so as to establish a common fluid flow path 604 between each inlet/outlet port 602 and each flow path 20b. And each inlet/outlet port 602' aligns with a separate opening 21, establishing fluid communication with the associated flow path 21b.

The flow-through manifold 600 allows one fluid supply, preferably a gas supply, to feed all eight reactor wells 14 via the associated flow path 20a or 20b. This arrangement requires fewer hoses or connectors than the general use manifold 56 to establish fluid communication between the manifold inlet/outlet ports 602, 602' and flow paths 20a, 20b. This arrangement also permits each flow path 21a, 21b to be vented separately to the head space 17 as previously discussed, and out of the reactor block 12 to ambient conditions, if necessary. Further, the respective flow paths 21a, 21b can be plugged using known techniques if venting to the head space 17 is not necessary or undesirable.

Alternatively, the inlet/outlet ports 602, 602' can be configured so as to define separate flow paths through the manifold bar 55. This arrangement can be used where it is desirable to have different gas flow requirements for each well 14, and results in a setup identical to that of the general use manifold 56.

Static Pressure Manifold

Figure 18A:
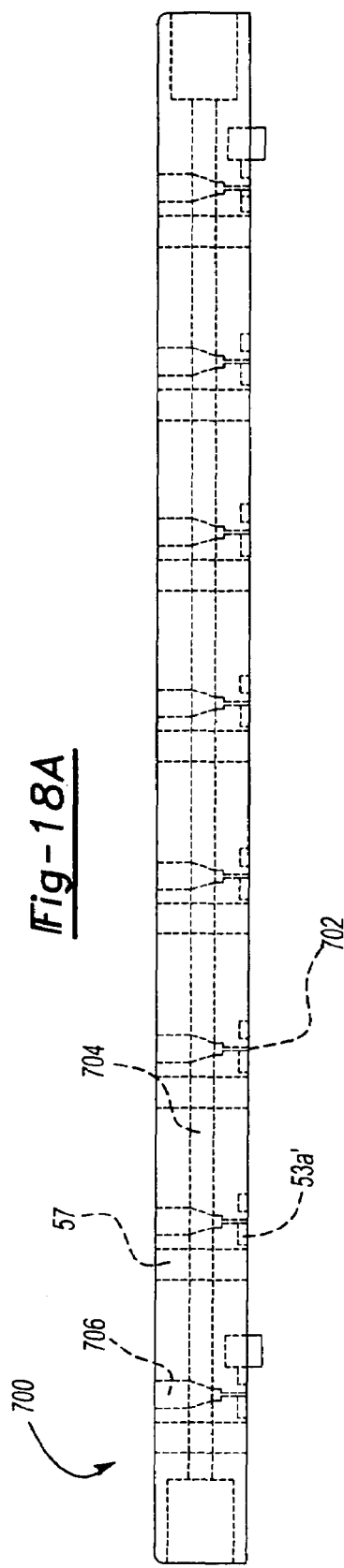
FIGS. 18a–b show a perspective view of a static pressure manifold assembly formed in accordance with the teachings of this invention.

In still another embodiment, the general use manifold assembly 56 can be configured as a static pressure manifold 700, as best seen in FIGS. 18a, b. It will be appreciated that the general use manifold assembly 56 and the static pressure manifold 700 share common elements. Thus, common reference numerals are used to describe common features. The static pressure manifold 700 is virtually identical to the general manifold assembly 56, and includes a metal manifold bar 55 defining a plurality of inlet/outlet port pairs 702, 702'. The inlet/outlet ports 702, 702' are each separately surrounded by an O-ring interface 53a', 53b'.

Figure 18B:
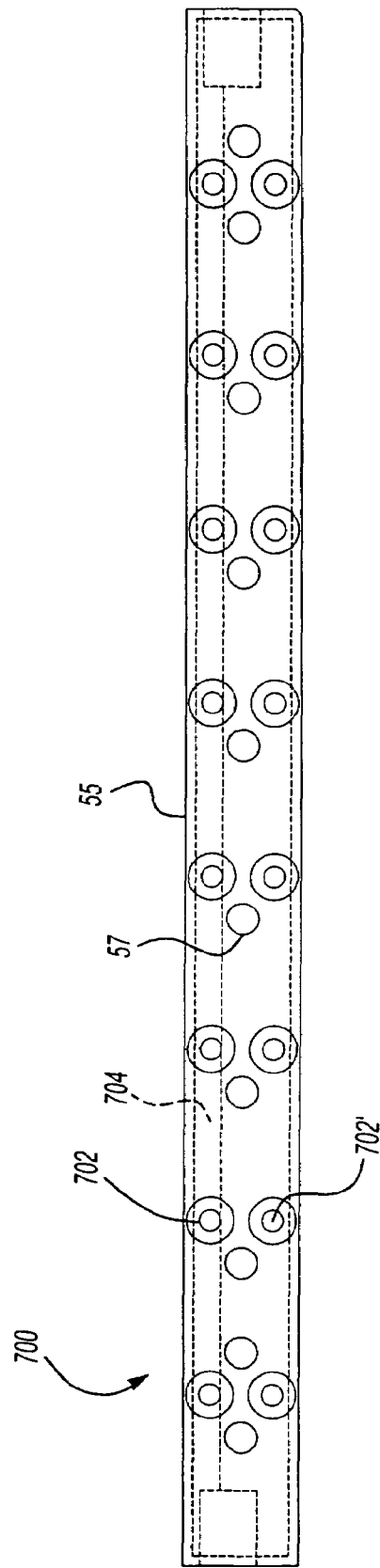

The static pressure manifold 700 differs from the general use manifold assembly 56 in that each inlet/outlet port 702 is joined in fluid communication, as best seen in FIG. 18b. This arrangement permits a common flow path 704 through the eight inlet/outlets 702, as best seen in FIG. 18a. However, each of the eight inlet/outlet port 702' can define separate flow paths 706 through the manifold bar 55.

When a single static pressure manifold bar 55 is coupled to the reactor block 12 at sidewall surface 22b, each inlet/outlet port 702 aligns with an opening 21 so as to establish fluid communication with and a common flow-through each respective flow path 21a, and each inlet/outlet port 702' aligns with an opening 20 to establish fluid communication with a respective flow path 20a. This arrangement allows one gas supply to feed all eight reactor wells 14 via the flow path 21a, thus simplifying the assembly in comparison to the general manifold 56. This arrangement also permits the establishment of a common pressure at each reactor well 14 via each flow path 21a. If a second static pressure manifold bar 55 is coupled to the sidewall surface 22b', each inlet/outlet port 702 aligns with an opening 21 so as to establish fluid communication with and a common flow-through each flow path 21b, and each inlet/outlet port 702' aligns with an opening 20 to establish fluid communication with a respective flow path 20b.

Using the described arrangement of two static pressure manifold bars 55 coupled to opposing sides of the reactor block 12, each flow path 21a is joined to a common pressure source and each flow path 21b is vented through a common flow path. Yet the flow paths 20a, 20b can be separately coupled to fluid sources or vented or plugged as desired.

The static pressure manifold 700, like the flow-through manifold 600, can permit a fluid, preferably a gas, or additional chemistry to be added to or a sample to be withdrawn from each vessel 16 or well 14 via the respective flow path 21a, 21b. And if a particular flow path 20a, 20b (also applies to flow paths 21a, 21b) is not needed for a particular experiment, the respective flow path or the inlet thereto can be plugged using known techniques. And under certain conditions one of the flow paths 21a or 21b can be vented to the head space 17 while the other flow path 21a or 21b is coupled to a single fluid source.

In an alternative embodiment, each inlet/outlet port 702 can be configured so as to define separate flow paths through the manifold bar 55. This configuration would result in an assembly identical to that of the general use manifold 56.

Each of the manifold assemblies 56, 600 and 700 can be used interchangeably. That is, a single general use manifold 56, flow-through manifold 600 or a static pressure manifold 700 could be used in conjunction with another general use manifold 56, flow-through manifold 600, or a static pressure manifold 700. The interchangeability of the various manifolds 56, 600 and 700 permits the user to establish a variety of flow paths through the reactor block 12.

Stir Top Assembly

One function of the stir top assembly 26 is to permit agitation of the reaction mixtures during the experiment. FIGS. 6–10 show a stir top assembly 26 formed in accordance with the teachings of this invention, and, more particularly, FIGS. 8 and 9 show a perspective view of the stir top assembly 26 formed in accordance with the teachings of this invention.

As best seen in FIGS. 8 and 9, the stir top assembly 26 can include an injector plate 28 having a top surface 28a, bottom surface 28b and a sidewall surface 28c, a stirring blade assembly 30, one or more dip tubes 32a, 32b and a cover 31a.

Injector Plate

As shown in FIG. 9, the injector plate 28 defines a plurality of openings for supporting various components. As best seen in FIG. 9, the bottom surface 28b of the injector plate 28 defines one or more holes (not shown) for receiving a dowel pin 24. As shown in FIG. 9, two dowel pins 24 are supported by the injector plate 28. The dowel pins 24 provide a means for aligning the stir top assembly 26 with the reactor block 12, as best seen in FIG. 2a. The dowel pins 24 can include a smooth outer perimeter that frictionally engages the outer perimeter of the mating opening, or the dowel pins 24 can include a threaded surface that mates with threads supported by the mating hole.

As best seen in FIG. 9, the injector block 28 defines one or more mounting holes 25a for receiving threaded fasteners such as screws for coupling the injector plate 28 to the cover 31a (discussed in more detail below). The injector plate 28 can also include a plurality of openings 25b along the length of its sidewall 28c, as best seen in FIG. 9. The openings 25b receive threaded fasteners such as bolts or screws for coupling the injector plate 28 to the manifold assembly 56, 600 or 700.

As best seen in FIGS. 2b, 8 and 9, the injector plate 28 can also include a plurality of openings 65 for receiving threaded fasteners for coupling the injector plate 28 to an adjacent component. The injector plate 28, as shown in FIG. 9, can include an opening 34b for receiving a shaft 36 for coupling the motor 19 to the stir top assembly 26.

As shown in FIG. 9, the injector plate 28 can also include a plurality of openings 51. As best seen in FIG. 5, a delivery tube 37a is received in and extends downwardly from each opening 51. Each delivery tube 37a allows the injection of chemistry into one or more wells 14. As best seen in FIG. 5, each delivery tube 37a extends into a single reactor well 14. Preferably, the delivery tube 37a extends below the surface of the sample contained in the respective reactor well 14 as shown in FIG. 5. The delivery tube 37a can be fabricated of a polymer such as glass or plastic or any other material that is chemically inert to the sample and/or the fluid being injected into the well 14.

Also, as shown in FIG. 5, the injector plate 28 defines a flow path 37b. The flow path 37b is in fluid communication with the delivery tube 37a, and extends laterally through the injector plate 28, terminating at the injector plate sidewall surface 28c.

Referring back to FIG. 9, the injector plate 28 also includes a plurality of openings 41. As best seen in FIG. 7, the openings 41 can receive a collar 44, such as a threaded insert, sleeve or nut, by an interference fit for supporting a mating component.

As shown in FIGS. 9 and 7, the injector plate 28 also defines a plurality of fluid openings 33. As best seen in FIG. 7, each opening 33 is in fluid communication with respective flow paths 33a, 33b. As best seen in FIGS. 5 and 7, each flow path 33a, 33b extends angularly upwards through the injector plate 28 and terminates at respective internal openings 35a, 35b defined by an interior portion of the injector plate 28.

The injection plate 28 can be formed of a metal, preferably stainless steel. It will be appreciated that all openings and flow paths formed therein can be formed using known machining or metal working techniques.

Stirring Blade Assembly

As shown in FIG. 9, the injector plate 28 can further include a plurality of mounting holes 59 for supporting the stirring blade assembly 30 (discussed in more detail below). As best seen in FIGS. 6 and 9, the stirring blade assembly 30 comprises a plurality of stirring members, preferably one stirring member for each well 14, and includes a spindle 38 and a stirring blade 40. The stirring blade assembly 30 of the present invention is identical to that described in U.S. application Ser. No. 09/548,848, the discussion of which is incorporated herein by reference.

Turning first to the stirring blade 40, as shown in FIGS. 6 and 8, the stirring blade 40 can be configured as a substantially planar hooked-shaped finger. The finger can be fabricated of a polymer such as glass or plastic or a coated metal, provided the selected material does not react with the chemistry in the vessel 16 (or well 14). It will be understood that the stirring blade 40 can be configured using a variety of simple or complex geometric configurations, including but not limited to rectangular, circular, etc.

As best seen in FIGS. 6 and 7, the spindle 38 can be an elongated metal bar, with the preferred metal being stainless steel. The spindle 38 can include a first end 38a and a second end 38b, the first end 38a being rotatably coupled to the stirring blade 40 using known techniques.

The second end 38b of the spindle 38 is mechanically coupled to a gear 43 in accordance with conventional mounting techniques, as best seen in FIG. 7. The gear 43 is supported by the second end 38b of the spindle 38 such that the gear 43 meshes with an adjacent gear 43, as best seen in FIG. 6. The combination of adjacent meshed gears 43 forms a gear train that is accessible through the cover 31a for driving the spindle 38 and the associated stirring blade 40. The gears 43 forming the gear train can be conventional gears of the type generally used for forming a direct drive gear train assembly, wherein the gear train directly drives one or more components coupled to each individual gear of the gear train.

The gear train (the plurality of meshed gears 43) is coupled to a magnetic feed through 42 using known techniques. The magnetic feed through 42 couples the gear train to the first end 38a of the spindle 38, as best seen in FIG. 6. The spindle 38 mechanically couples the motor 19 to the gear train such that the rotational speed of the motor 19 is proportional or identical to the torque applied to the spindle 38 and the stirring blade 40.

The motor 19 provides sufficient torque for rotating the stirring blades 40 at the same speed. For instance, the stirring blade 40 can be rotated at a speed varying from approximately zero to 3,000 rpm, and even more particularly from approximately 100 rpm to approximately 1,000 rpm. The rotational speed of the motor 19 can be monitored via a motor speed controller 132 (discussed in detail in the subsection describing the heater and motor control box 116)

It will be appreciated that alternative drive means such as, but not limited to, belts, chains or sprockets, a combination of the aforementioned, magnetic followers or other drive mechanisms could be used to power the stirring blade assembly 30.

Dip Tubes

As best seen in FIGS. 5, 6 and 7, the reactor block assembly 12 supports a plurality of dip tube pairs 32a, 32b, preferably one dip tube 32a, 32b pair for each well 14. The dip tubes 32a, 32b can comprise hollow open-ended tubular members having a first end 39a and a second end 39b. Each dip tube 32a, 32b can be made of glass, plastic, coated metal tubes or any material that will not chemically react with the reaction mixtures.

Each dip tube 32a, 32b is positioned within a mounting hole 51 such that the stirring blade assembly 30 is positioned intermediate the dip tubes 32a, 32b as best seen in FIGS. 5, 6 and 7. Specifically, the first end 39a of each dip tube 32a, 32b is supported by the collar 44, the collar 44 being sized to frictionally engage a portion of the perimeter of each dip tube 32a, 32b to secure each dip tube 32a, 32b in position. As best seen in FIGS. 5 and 7, each dip tube pair 32a, 32b extends downwardly from the respective mounting holes 51 in parallel relationship. Additionally, as best seen in FIG. 6, a filter 45 is supported by the top surface of the collar 44 above each dip tube 32a, 32b to permit filtering of the sample, if any, withdrawn from the reactor well 14 or fluids injected into the reactor well via the dip tubes 32a, 32.

Cover

As best seen in FIG. 9, the top surface 28a of the injector plate 28 is partially enclosed by a cover 31a so as to enclose the gear drive assembly 43 supported by the injector plate 28. The cover 31a can be secured to the injector plate 28 by screws (not shown) inserted into mating openings defined by the cover 31a and the bottom surface 28b of the injector plate 28.

As best seen in FIG. 8, the cover 31a is a substantially elongated member and defines a plurality of indentations 31b. As shown in FIG. 8, the cover 31a can include eight indentations 31b. Each indentation 31b defines a gripping surface that helps facilitate hand carrying the reactor block 12.

As shown in FIG. 8, the cover 31a also includes an opening 34a. The opening 34a can be formed using known machining techniques. As best in FIGS. 4 and 8, the opening 34a receives a shaft 36, the shaft 36 having a first end and a second end, wherein the first end supports a screw cap 34. The second end engages a slot 146 defined by the motor 19 shaft, as best seen in FIG. 4.

The cover 31a is preferably fabricated of aluminum using known machining or metal working techniques. And it will be appreciated that other materials having similar chemical, thermal or material properties could be used.

Stir Top Injection Manifold Assembly

Referring back to FIGS. 8 and 9, if desirable, the stir top assembly 26 can support an injection manifold 46, which allows additional chemistry such as catalysts, solutions, slurries or other components to be added to one or more vessels 16 (or each reactor well 14 if no vessel 16 is used) during an experiment. The injection can take place under pressure and without reducing the pressure in the vessels 16 or wells 14. The injection manifold 46 can include a standard metal manifold bar 47, with the preferred metal being stainless steel.

As best seen in FIG. 8, the manifold bar 47 can include a first plurality of openings 29 for receiving threaded fasteners for coupling the manifold bar 47 to the injector plate 28. The manifold bar 47 also defines a second plurality of axially aligned openings 49, wherein the openings 49 are added to reduce the weight of the manifold bar 47.

As best seen in FIG. 8, the manifold bar 47 also defines a second plurality of openings 50 for receiving a threaded fill port cap 52. The fill port cap 52 includes an elongated body 52' having a longitudinal axis and a bore 68 centered on the longitudinal axis. The bore 68 can extend the length of the elongated body 52', and can receive and support a cylindrical sleeve or fitting 74 having a through hole centered on the axis of the fitting 74. The fitting 74 can be fabricated of a chemically resistant plastic such as perfluro-elastomer or polyethyethylketone or polytetrafluoroethylene. As best seen in FIGS. 5 and 8, the fitting 74 can be seated within the bore 68 of the elongated body 52', and can support at least one injector or delivery probe 48 by an interference fit with an O-ring seal (not shown) or other similar sealing device. The injector or delivery probe 48 can be a hollow glass, plastic or coated metal open-ended tube.

One or more conduits or vessels (not shown) can be used to couple the delivery probe 48 to components to be injected into the vessel 16. Alternatively, the delivery probe 48 or the bore 68 could be placed in direct fluid communication with a delivery device such as a syringe or other similar device for injecting the chemistry or other components into one or more vessels 16. It will be appreciated that the same or different chemistry or other components can be injected into the one or more vessels 16 using the injection manifold 46.

Referring back to FIGS. 5 and 6, the fill port cap 52 also supports a plug 52a for opening and closing a flow path 50a machined through the manifold bar 47 wherein separate flow path 50a are in fluid communication with each respective well 14. As best seen in FIG. 5, each flow path 50a extends through a portion of the sidewall surface of the injection manifold bar 47, and is in fluid communication with flow path 37b of the stir top assembly 26. Thus, the flow path 50a couples the injection manifold 46 in fluid communication with the reactor block 12 via the flow path 37b and associated delivery tube 37a.

As best seen in FIG. 6 when the fill port cap 52 is tightened down, the plug 52a blocks fluid flow-through the respective flow path 50a, and consequently flow to the delivery tube 37a and the associated flow path 37b. When the screw cap 52 is loosened and backed slightly out of the opening 50, the plug 52a is backed out of the flow path 50a, thus allowing fluid flow-through the respective flow path 50*a* and, consequently, through the flow path 37*b* and associated delivery tube 37*a*.

In an alternative embodiment, the stir top assembly 26 can support a blank manifold 54, as best seen in FIG. 10. The blank manifold 54, like the injection manifold 46, can include an elongated stainless steel bar 47. The blank manifold 54 can define a plurality of axially aligned threaded holes 54*a* for receiving threaded fasteners such as screws or bolts for plugging the flow path 37*b* through the injector plate 28.

Regardless of the embodiment of the manifold configuration 46 or 54 used, either manifold assembly 46, 54 can be coupled to the injector plate 28 via threaded fasteners. As best seen in FIG. 10, the manifold 46 or the blank manifold 54 can be attached to the injector plate by inserting threaded fasteners into aligned openings 54*a* and 25*b* defined by the injection manifold 46 and the injector plate 28, respectively. If the injection manifold 46 is used instead, the threaded fasteners are inserted through aligned openings 29 and 25*b*, wherein opening 29 is defined by the injection manifold bar 47.

Sampling Manifold Assembly

Figure 13:
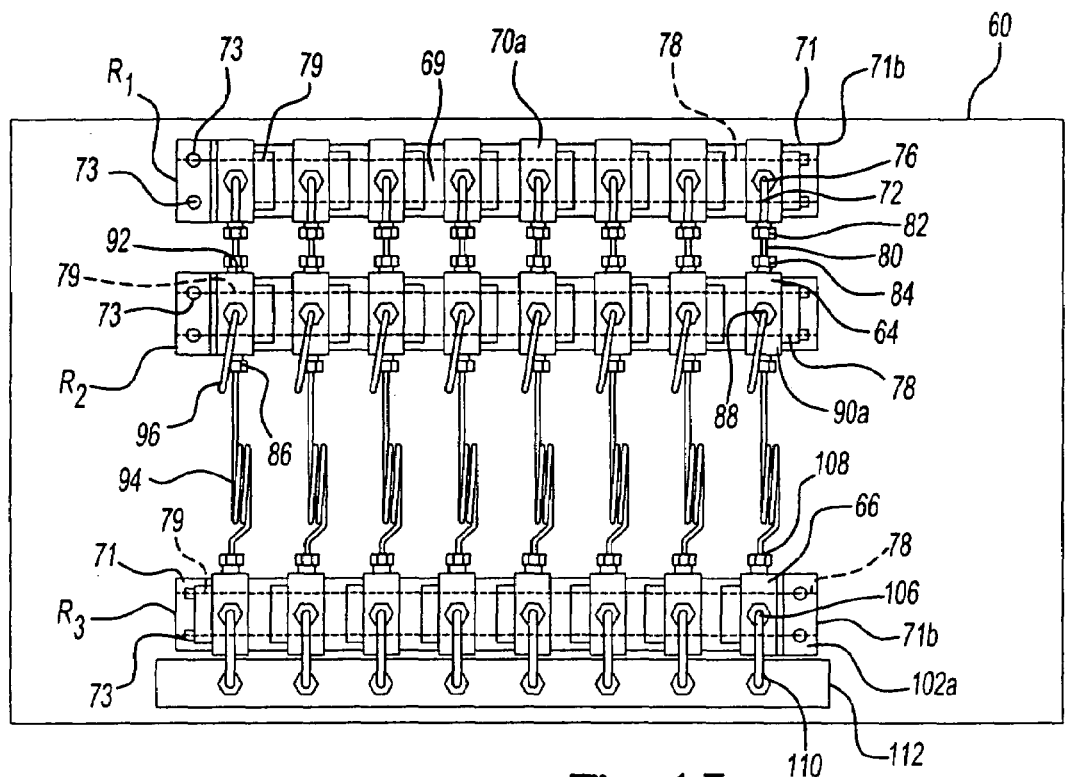
FIG. 13 shows a rear perspective of the sampling manifold shown in FIG. 12, and illustrates the manner in which the flow valves shown in FIG. 12 are coupled to the sampling manifold plate.

Turning now to FIGS. 12-15, a sampling manifold assembly 58 is shown formed in accordance with the teachings of the present invention. The sampling manifold assembly 58 allows the removal of a small volume of the reaction mixture from a pressurized vessel 16 (or vessel 14) during or after an experiment. As best seen in FIGS. 12, 13, the sampling manifold 58 can include a manifold plate 60, a plurality of flow control valves 62, 64, and 66, and a sample vial 98.

The manifold plate 60 can be a planar rectangular metal plate formed using known metal working techniques. One of skill in the art will appreciate that the manifold plate 60 can be formed using other simple or complex geometric configurations, including, but not limited to circular, hexagonal, triangular, etc. In the disclosed embodiment, the manifold plate 60 defines a plurality of openings (not shown) for receiving and supporting the flow control valves 62, 64, 66 as best seen in FIGS. 12, 13. The holes can be formed in the plate 60 using know machining or metal working techniques.

Figure 14:
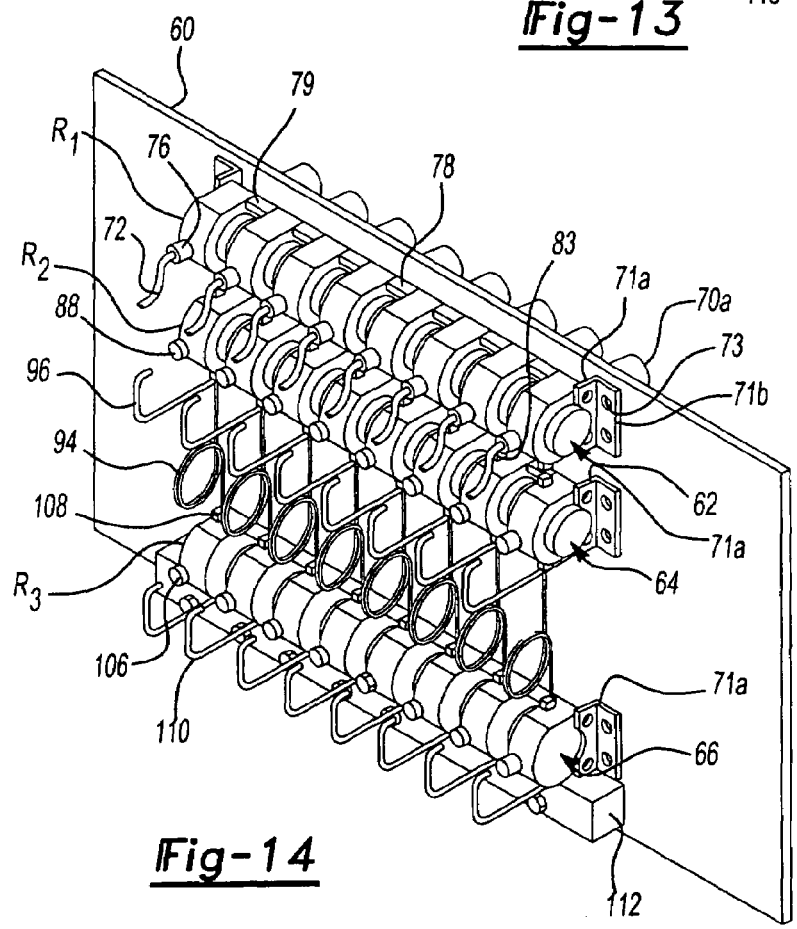
FIG. 14 shows a rear perspective view of the sampling manifold assembly shown in FIG. 12.

Turning now to a more detailed discussion of each flow control valve 62, 64, and 66, the first flow control valve 62 can be a standard 2-way needle valve of the type typically used in the industry, as best illustrated in FIG. 15. The first flow control valve 62 can include a valve body 70*a* and a rotatable control knob 70*b*, as best seen in FIGS. 13, 14. As best seen in FIG. 15, the control knob 70*b* opens and closes a fluid flow path 80 through the flow control valve 62.

The first flow control valve 62 can also include an inlet port 76 and an outlet port 82. The inlet port 76 is opened and closed by rotating the rotatable knob 70*b*, wherein the knob 70*b* can be selectively rotated so as to expose the inlet port 76 to ambient conditions (open position) or rotated so as to seal the inlet port 76, isolating the inlet port 76 from ambient conditions (closed position) and closing flow path 80.

As shown in FIGS. 13, 14, the inlet port 76 supports a first stainless steel hollow, open-ended tubular member 72 via a standard fitting, wherein one end of the first tubular member 72 is in fluid communication with a vessel 16 (or well 14) via a respective dip tube 32*a*, 32*b*. The outlet port 82 is formed on the valve 62 at approximately 90° below the inlet port 76. The outlet port 82 supports a second stainless steel hollow, open-ended tubular member 83 of the type previously described. The second tubular member 83 is also supported in the outlet port 82 via a standard fitting.

The second flow control valve 64 can be a standard normally open valve, as best illustrated in FIG. 15. As shown in FIGS. 13, 14, the second flow control valve 64 can include a valve body 90*a* and a rotatable control knob 90*b*, wherein the control knob 90*b* can be rotated to establish fluid communication between a fluid flow path 85 through the flow control valve 64 and a sample vial 98 (discussed in more detail below), as best seen in FIG. 15.

As shown in FIG. 13, the second flow control valve 64 includes first and second inlet/outlet ports 84, 86 and an outlet port 88. The inlet port 84 is defined at a first position 92 on the flow control valve 64, wherein the first position 92 is located on the valve 64 body at approximately 90° above the rotatable knob 90*b*. The inlet port 84 receives the opposite end of the second tubular member 83 supported by the first flow control valve 62.

As also shown in FIG. 13, the second inlet/outlet port 86 is formed on the valve body 90*a* at a location approximately 180° below the first position 92 and approximately 90° below the control knob 90*b*. The second inlet/outlet port 86 supports a third hollow tubular member 94 of the type previously described.

As shown in FIG. 13, the inlet/outlet port 88 is located on the valve 64 body at a position approximately 180° relative to the position of the control knob 90*b* or 90° to the left of the first position 92. The outlet port 88 supports a fourth hollow tubular member 96 of the type previously described. As shown in FIG. 13, the opposite end of the hollow fourth tubular member 96 is in fluid communication with the sample vial 98 (discussed in more detail below).

As best seen in FIG. 15, the third flow control valve 66 can be a conventional 2-way needle valve. As shown in FIGS. 13, 14, the third flow control valve 66 includes a body 102*a* and a rotatable control knob 102*b*, wherein the rotatable control knob 102*b* open and closes a flow path 104 through the valve body 102*a*, as best seen in FIG. 15.

As shown in FIG. 13, the valve 66 also includes an inlet port 106 and an outlet port 108. The inlet port 106 is located on the valve body 102*a* at a position approximately 180° from the position of the control knob 102*b*. The inlet port 106 supports one end of a fifth hollow tubular member 110 of the type previously described via a standard fitting. The opposite end of the fifth tubular member 110 is coupled to a source of fluid under pressure 112 also via an interference fit.

The source of fluid under pressure can be a low pressure nitrogen gas or other gas or fluid that will not react with the sample fluid, the valves or tubing with which the pressurized fluid comes into contact. The outlet port 108 is located on the valve body 102*b* approximately 90° above the position of the control knob 102*b*, and is in fluid communication with the second valve 64 via the third tubular member 94.

As shown in FIG. 14, the valves 62, 64, and 66 can be aligned along the manifold plate 60 such that the first flow control valve 62 is positioned at the upper portion of the manifold plate 60, the second flow control valve 64 is positioned at a lower position on the manifold plate 60, and the third flow control valve 66 is positioned below the second valve 64 such that the second flow control valve 64 is positioned intermediate the valves 62 and 66.

As best seen in FIGS. 13, 14, eight flow control valves 62, 64, 66, respectively, are coupled to the manifold plate so as to form a single row R1, R2, R3, wherein the respective rows includes eight valves 62, 64 or 66. As best seen in FIGS. 13, 14, row R1 includes only flow control valves 62, row R2 includes only flow control valves 64, and row R3 includes only flow control valves 66. Each adjacent control valve 62, 64 and 66, respectively, is separated by a spacer 69, as best seen in FIG. 13. Each valve 62, 64, and 66 is mounted onto the manifold plate 60 such that the valve body 70*a*, 90*a*, 102*a*, respectively, protrudes from the rear of the manifold plate and the rotatable knob 70*b*, 90*b*, 102*b*, respectively, protrudes from the front of the manifold plate 60.

As best seen in FIG. 14, each row R1, R2, R3 of valves 62, 64, 66, respectively, is coupled to the manifold plate 60 via a mounting bracket 71. The mounting bracket 71 includes a first portion and a second portion 71*a*, 71*b* defining a pair of openings 73 of the mounting bracket 71. Each opening 73 aligns with openings (not shown) defined by each valve 62, 64 and 66.

As shown in FIG. 14, a rod 78, preferably threaded, is inserted through the respective openings defined by the valves 62, 64, and 66 and the respective mating openings 73. The rod 78 extends through each of the respective valves 62, 64, and 66 forming the respective row of valves R1, R2, and R3. One end 79 of the rod 78 supports a nut or other threaded sleeve (not shown) for coupling the rod to the mounting bracket first portion 71*a*, and the mounting bracket first portion 71*a* is coupled to the manifold plate 60 via the mounting bracket second portion 71*b*. The mounting bracket second portion 71*b*, as best seen in FIG. 14, can be attached to the manifold plate 60 by inserting threaded fasteners such as screws or other similar devices through the openings 73.

Now referring back to FIG. 12, the sample vial 98 can comprise an enclosed cylindrical container 113. The cylindrical container 113 can include a first surface 114 defining an open top 115 for receiving one end of the fourth tubular member 96.

Heater and Motor Control Box

The heater and motor control box 116 permits separate control of the temperature of each reactor well 14. As best seen in FIG. 11, there is one heater controller 120 for each reactor well 14, and a single motor control 122 for controlling the motor 19. As shown in FIGS. 1 and 11, the heater and motor control box 116 of the present invention can include a base 118; a temperature control system 117 including heater controllers 120, microprocessors 123, temperature display devices 124, and a solid state relay 128; and a motor controller 122.

As shown in FIGS. 1 and 11, the base 118 retains the components comprising the heater and motor control box 116, and includes a removable top surface 119 and sidewall surfaces 125, 127. The top surface 119 can define a plurality of mounting holes 121 for receiving threaded fasteners such as screws for coupling the top surface 119 to the sidewalls 125, 127. The top surface 119 can also include a plurality of vent holes 126 to allow air circulation thorough the heater and motor control box 116.

Each sidewall surface 125, 127 defines one or more openings formed therein using known machining or metal working techniques. The sidewall surfaces 125 define a plurality of openings 129 for coupling the sidewall 125 to the an adjacent sidewall surface. The sidewall 125 also defines a vent opening 126 which cooperates with the vent 126 defined in the top surface 119 to permit air circulation through the heater and motor control box 116.

Sidewall surface 127 defines a plurality of openings (not shown) for supporting electrical connectors or interface plugs 136 using known mounting techniques. The connectors or interface plugs 136 can be supported in the openings (not shown) using an interference fit. Additionally, the electrical connectors 136 can be of a type generally known and used in the industry, and electrical wiring to be coupled thereto can be attached to the electrical connectors or interface plugs 136 in accordance with known wiring techniques.

As shown in FIG. 11, the sidewall surface 127 also defines a plurality of openings (not shown) for receiving and supporting a motor on/off switch 135 for controlling the operation of the motor 19. The sidewall surface 127 also supports a motor speed control 132, which permits adjustment of the speed of the motor 19. Also shown in FIG. 11, the sidewall surface 127 supports a display panel for the motor speed control 134. The display screen 134 can include a standard display device such as a liquid crystal display or other similar device that displays digital or analog information indicative of the speed of motor 19.

The sidewall surface 127 also supports a display screen 124 for the heater controller 120. The display screen 124 can include a standard display device such as a liquid crystal display or other similar device for displaying digital or analog information indicative of, or that can be used to determine, the temperature of the reactor well 14 in electrical communication with the display screen 124. As shown in FIG. 1, the display screen 124 can support a selectively adjustable temperature control switch 142. The temperature control switch 142 permits a user to manually increase or decrease the desired temperature of the respective reactor well 14, vessel 16 or both.

In addition to the display screen 124, each heater controller 120 can also include a microprocessor 123 for monitoring and adjustment of the temperature of the heating device 99. It will be appreciated that the microprocessor 123 is electrically coupled to the temperature control switch 142, permitting user variation of the desired temperature of the reactor well 14, vessel 16 or both.

To control the supply of power to the heating devices 100, the microprocessor 123 can be electrically coupled to a conventional solid state relay 128, as shown in FIG. 11. The solid state relay 128 can be caused to become active by depressing the temperature control switch 142, i.e., to increase or decrease the power to the heating device 99. In the disclosed embodiment, the solid state relay 128 can be activated by activating the control switch 142 supported by the display screen 124.

To aid the temperature sensing function of the microprocessor 123, the microprocessor 123 can be electrically coupled to a temperature sensor 144 such as a thermocouple. As best seen in FIG. 2*a*, the temperature sensor 144 can be inserted into channel 133 defined by the well body 14*a*. This arrangement establishes thermal contact between the temperature sensor 144 and the respective reactor well 14. When the microprocessor 123 via the temperature sensor 144 detects a temperature above or below the selected temperature, the microprocessor 123 can cause the activation of the solid state relay 128

In operation, heating of the reactor wells 14 or vessels 16, or both can occur by electrically coupling the microprocessor 123 to a heating device 99 for each respective well 14 and placing the heating device 99 in thermal contact with a respective well 14, as shown in FIGS. 2*a* and 3*d*. The heating device 99 can be a pair of heating probes that can be inserted into the respective well 14 through channels 130 formed along the perimeter of each well 14, as best seen in FIG. 2*a* and 3*d*. Each heating device 99 can be placed in thermal contact with the temperature sensor 144, wherein the temperature sensor 144 is electrically coupled to the microprocessor 123.

The microprocessor 123 is electrically coupled to the display screen 124 such that the display screen 124 displays information indicative of the temperature (or information that can be used to calculate the temperature) of the particular heating device 99, reactor well 14 or vessel 16.

Depending on the application, each reactor well 14 or vessel 16 can be maintained at the same temperature or at different temperatures during an experiment. For example, one may screen compounds for catalytic activity by first combining, in separate vessels 16, each of the compounds with common starting materials; these mixtures can be allowed to react at uniform temperature. One may then further characterize a promising catalyst by combining it in numerous vessels with the same starting materials used in the screening step. The mixtures can be allowed to react at different temperatures to gauge the influence of temperature on catalyst performance (speed, selectivity).

Referring back to FIG. 11b, the motor controller 122 is of a type known in the industry, and is secured to the base 118 using threaded fasteners such as screws. The motor controller 122 is electrically coupled to the motor 19 using conventional wiring techniques. The motor controller 122 can also be electrically coupled to a motor speed control 132 to allow adjustment of the speed of the motor 19. As best seen in FIG. 11, the speed of the motor 19 can be monitored via a motor speed readout 134 supported by the base 118 via an interference fit. The motor speed readout 134 displays digital or analog data indicative of the motor 19 speed or information that can be used to compute motor 19 speed.

The motor controller 122 described herein is manually adjustable. However, the motor controller 122 could be adjusted automatically via a computer or microprocessor as described in U.S. application Ser. No. 09/548,848, the discussion of which is incorporated herein by reference.

Assembly

The parallel reactor 10 can be easily assembled by assembling together the various subsystems, e.g., the reactor block 12, the stir top assembly 26, the manifold assembly 56, the sampling manifold assembly 58, and the heater and motor control box 116. The subassemblies can be assembled together as follows to form the parallel reactor 10:

As best seen in FIG. 2a, the reactor block 12 can be assembled in the manner previously described wherein the legs 18 are attached to the reactor block 12 using threaded fasteners. As shown in FIG. 1, the reactor block 12 can be supported by the heater and motor control box 116 by inserting threaded fasteners into openings 138 defined by foot 18d of leg 18 and mating openings (not show) defined by the top surface 119 of the heat and motor control box 116.

As shown in FIG. 2a, the stir top assembly 26, having been assembled in the manner described herein, can be coupled to the reactor block 12 such that the surface 28b of the injector plate 28 seals the reactor wells 14 from ambient conditions. The stir top assembly 26 is coupled to the reactor block 12 by aligning the dowel pin 24 with mating openings 11b formed in the reactor block 12. Prior to inserting the dowel pin 24 into the mating opening 11b, O-ring seals can be placed in the respective O-ring interfaces 13 and 27, as best seen in FIGS. 3a, 3b. The dowel pin 24 can then be inserted into the mating opening 11b, and threaded fasteners such as screws or bolts can be passed though centrally aligned openings 11a, 65 defined by the injector plate 28 and the top surface 22a of the reactor block 12a, respectively. Referring now to FIG. 7, when the reactor block 12 and the stir top assembly 26 are assembled, the respective openings 27 formed in the top surface 22a of the reactor block 12a align with a respective opening 33 defined by the injector plate 28 of the stir top assembly 26.

Additionally, when the stir top assembly 26 is in place, the stirring blade assembly 30 extends into the vessel 16 such that a portion of the stirring blade 40 lightly contacts the bottom of vessel 16, as best shown in FIG. 6. In another embodiment, the stirring blade 40 could be suspended just above, but not in contact with, the bottom of the vessel 16, as best seen in FIG. 5.

Also, as shown in FIG. 2a, the shaft 36 is coupled to the motor shaft 19a. The threaded knob 34 supported by one end of the shaft 36 is tightened down such that the shaft 36 engages a slot 146 defined by the motor shaft 19a. This arrangement couples the motor 19 to the shaft 36 by an interference fit.

The sampling manifold 58 can be coupled to the reactor block 12 via the manifold assembly 56, flow-through manifold 600 or the static pressure manifold 700. Regardless of the manifold assembly used 56, 600 or 700, the first tubular member 72 supported by each first flow control valve 62 is received in a respective manifold inlet/outlet opening 53a, 53b so as to couple the respective control valve 62 in fluid communication with a respective flow path 20a, 20b, as best seen in FIG. 1. As shown in FIG. 1, the inlet port 76 of a respective flow control valve 62 is coupled to a respective opening 20 via the respective hollow tubular member 72 by a standard fitting. The outlet port 82 of the respective first flow control valve 62 is coupled in fluid communication with the input port 84 of the respective vertically adjacent flow control valve 64 also using an interference fit, and the respective output port 86 of the respective second flow control valve 64 is coupled in fluid communication with the respective inlet/outlet port 108 of the respective third flow control valve 66 via a respective fourth tubular member 94.

Figure 20:
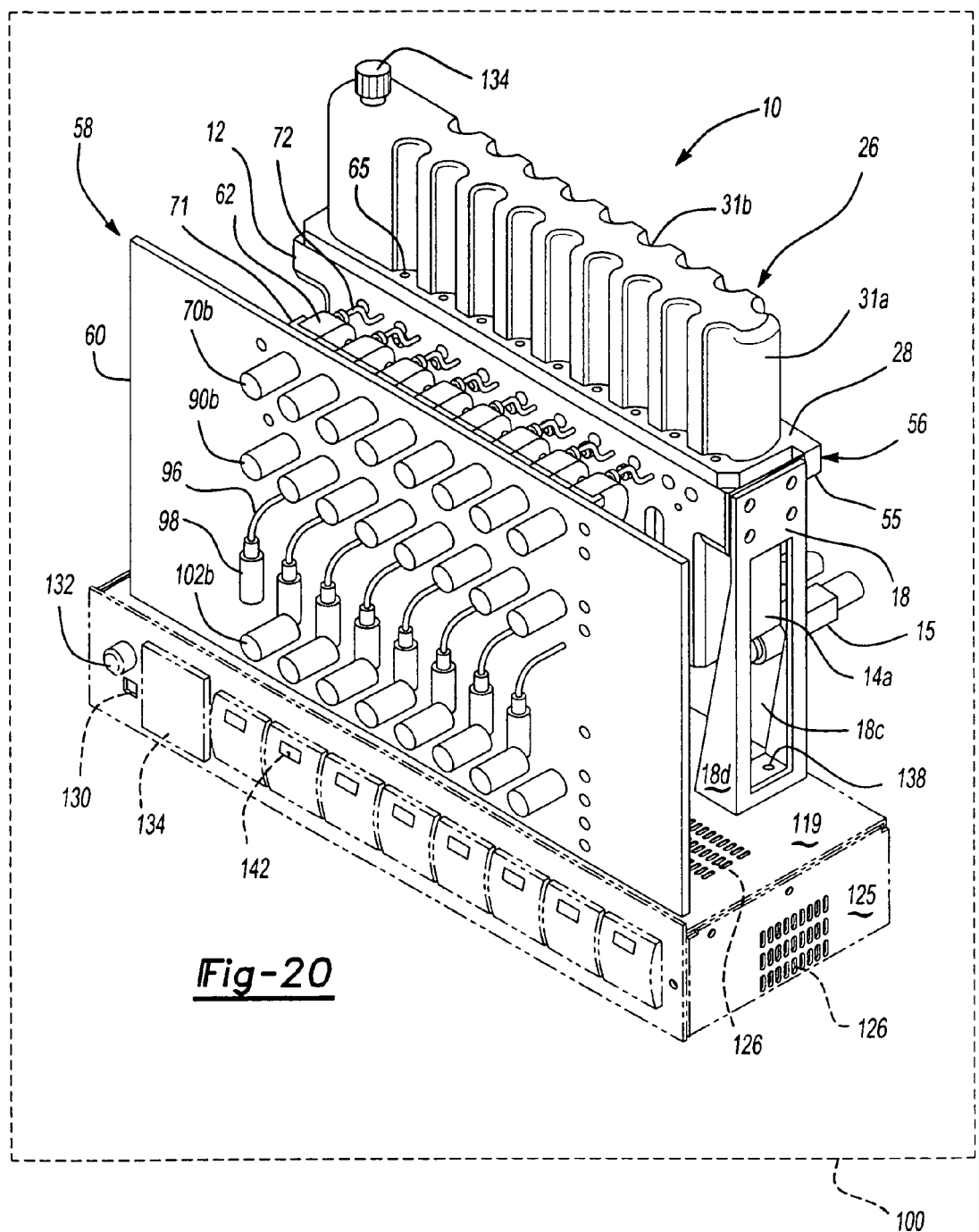
FIG. 20 shows an alternative embodiment of the parallel reactor shown in FIG. 1, wherein a sampling manifold establishes direct fluid communication with the reaction chambers.

Alternatively, the sampling manifold 58 can be coupled directly to the reactor block 12 as best seen in FIG. 20. In this arrangement, the first tubular members 72 are coupled in fluid communication with the respective flow paths 20a, 20b by an interference fit with an O-ring seal or other similar sealing device.

As an alternative embodiment, the parallel reactor 10 could be placed in a chamber 100, as shown in FIG. 1. The chamber 100 can be evacuated or filled with a desirable gas, such as an inert gas like nitrogen or argon. Alternatively, the chamber could be filled with gas for charging or inducing a pressure at each reactor well 14. In other cases, the chamber 100 may be used only during the loading of starting materials into the wells 14 to minimize contamination during sample preparation, for example, to prevent contamination of oxygen sensitive catalysts. The chamber 100 is most usefully a glove box (or dry box), such as those sold commercially by Vacuum Atmospheres, Inc.

Operation

Figure 19:
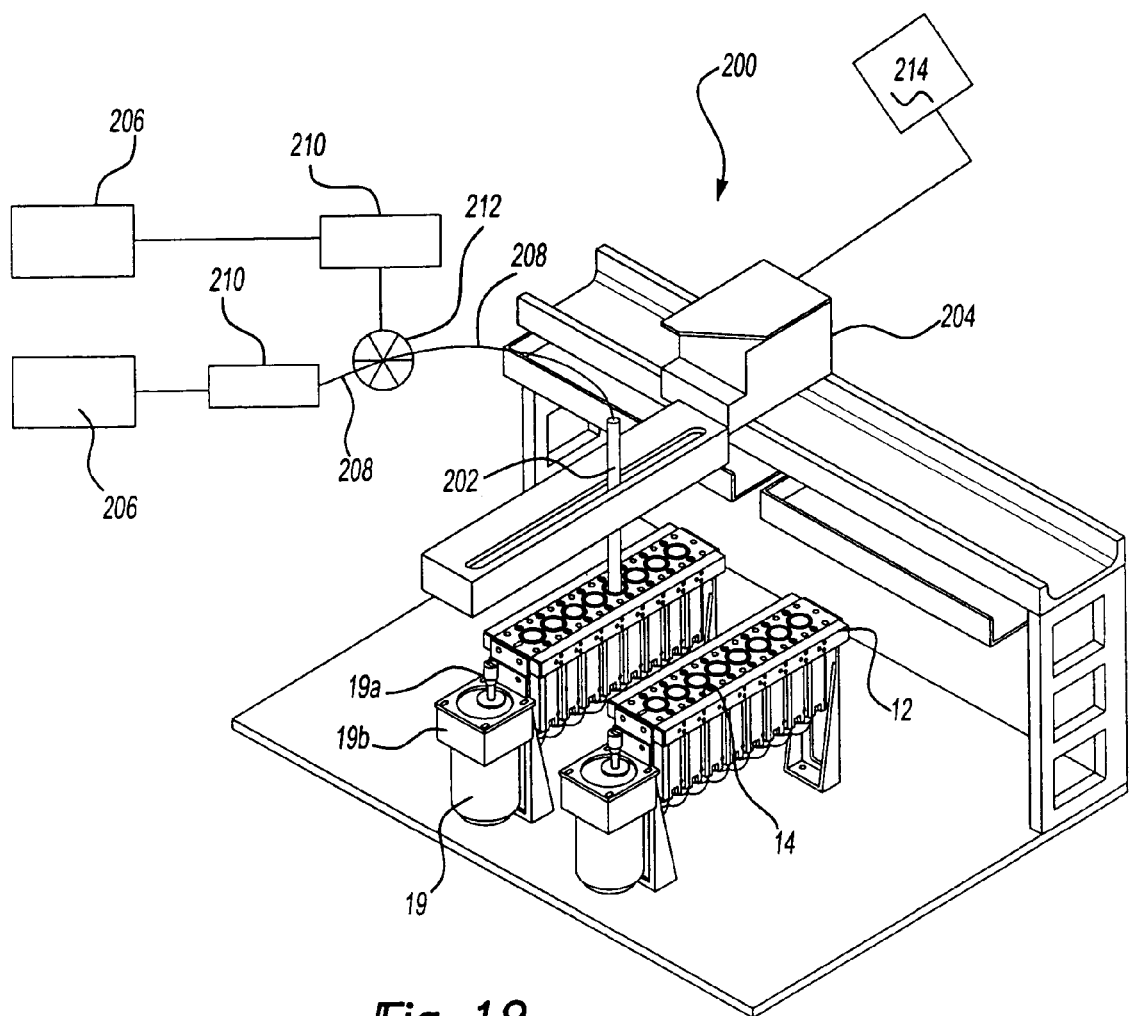
FIG. 19 shows a materials handling robotic systems used to add starting materials to the reaction chambers.

Up to eight different reaction mixtures can be processed during a single experiment conducted using the parallel reactor 10. Thus, not all reactor wells 14 must be used during a single experiment. And the same or different reaction mixtures can be added to the selected vessels 16. The reaction mixtures can be manually added to the selected vessels 16. Alternatively, a robotic material handling system 200 could be used to load the reaction mixtures into each of the vessels 16, as illustrated in FIG. 19.

The robotic system 200 is of a type known in the industry, and includes a pipette or probe 202 that dispenses measured amounts of liquids into each of the vessels 16. The robotic system 200 manipulates the probe 202 using a 3-axis translation system 204. The probe 202 is connected to sources 206 of chemistry or other reagents, preferably in liquid form, through flexible tubing 208. Pumps 210, which are located along the flexible tubing 208, are used to transfer the chemistry from the sources 206 to the probe 202. Suitable pumps 210 include peristaltic pumps and syringe pumps. A multi-port valve 212 located downstream of the pumps 210 selects which chemistry from the sources 206 is sent to the probe 202 for dispensing in the vessels 16.

The robotic fluid handling system 200 is controlled by a processor 214. In the embodiment shown in FIG. 19, the user first supplies the processor 214 with operating parameters using a software interface. Typical operating parameters include the coordinates of each of the vessels 16 and the initial compositions of the reaction mixtures in individual vessels 16.

After addition of the chemistry to each well, the stir top assembly 26 is attached, and the reactor system 10 can be pressurized to start the reaction process. The parallel reactor 10 is designed to permit experiments to be carried out at a maximum pressure of approximately 1500 psi and a maximum temperature of approximately 250° C. One of skill in the art will appreciate that the components of the parallel reactor 10 could be designed to accommodate a higher maximum pressure and temperature.

Heating the reaction mixtures, as well as temperature and pressure control, can play an important role in the reaction process. Heating and temperature are controlled by the heater and motor control box 116. Another important aspect of the present invention is the ability to monitor and separately regulate the temperature of the reaction mixtures, as permitted by the heater and motor control box 116.

During synthesis, temperature can have a profound effect on structure and properties of reaction mixtures. For example, in the synthesis of organic molecules, yield and selectivity often depend strongly on temperature. Similarly, in polymerization reactions, polymer structure and properties, molecular weight, particle size, monomer conversion, and microstructure, can be influenced by reaction temperature. During screening or characterization of combinatorial libraries, temperature control and monitoring of library members is often essential to making meaningful comparisons among members.

Temperature can also be used as a screening criteria or can be used to calculate useful process and product variables, including material properties. For instance, catalysts of exothermic reactions can be ranked based on peak reaction temperature and/or total heat released over the course of reaction, and temperature measurements can be used to compute rates of reaction and conversion.

Calorimetric Data Measurement and Use

Temperature measurements often provide a qualitative picture of reaction kinetics and conversion and therefore can be used to screen library members. For example, rates of change of temperature with respect to time, as well as peak temperatures reached within each of the vessels 16 can be used to rank catalysts. Typically, the best catalysts of an exothermic reaction are those that, when combined with a set of reaction mixtures, result in the greatest heat production in the shortest amount of time.

In addition to its use as a screening tool, temperature measurements combined with proper thermal management and design of the reactor system can also be used to obtain quantitative calorimetric data. From such data, scientists can, for example, compute instantaneous conversion and reaction rate, locate phase transitions (melting point, glass transition temperature) of reaction products, or measure latent heats to deduce structural information of polymeric materials, including degree of crystallinity and branching. U.S. application Ser. No. 09/548,848 describes a system and method for obtaining calorimetric data measurements, the discussion of which is hereby incorporated herein by reference.

Another important function of the present invention is the ability to stir or agitate the reaction mixtures in situ by the stir top assembly 26. The stir top assembly 26 can be activated by causing the motor 19 to drive each of the stirring blade assemblies 30 at a uniform speed. The stirring process can be continuous or repeated at selected intervals throughout the experiment.

Mixing variables such as stirring blade torque, rotation rate, and geometry, may influence the course of a reaction and therefore affect the properties of the reaction products. For example, the overall heat transfer coefficient and the rate of viscous dissipation within the reaction mixture may depend on the stirring blade rate of rotation. Thus, in many instances it is important that one monitor and control the rate of stirring of each reaction mixture to ensure uniform mixing, which in the disclosed embodiment is controlled by the motor speed controller 132.

Still another important aspect of the present invention is the ability to add additional chemistry or other components to the reaction mixtures during the experiment without depressurizing the reactor wells 14. The injection of materials into the vessel 16 can occur when the pressure of the vessel 16 is the same as or different from ambient pressure and at pressures ranging from ambient to approximately 1500 psi.

The parallel reactor 10 permits fluids such as additional chemistry to be introduced into, withdrawn from or vented through the reactor well 14. The introduction, withdrawal or venting of fluids can take place at any point during or after the experiment without reducing the pressure of the respective well 14. In the present invention the introduction of fluids can occur via the injection manifold assembly 46 or the reactor block manifold assemblies 56, 600 or 700.

Using the injection manifold 46, the introduction of one or more fluids or additional chemistry can be accomplished manually, by a robotic materials handling system as shown in FIG. 19 and using the method previously described herein for using robotic materials handling systems or by other similar devices and techniques. The introduction, withdrawal or venting of fluids, including additional chemistry via the reactor block manifold assemblies will be illustrated with reference to the flow-through manifold 600.

Conducting a Flow-Through Experiment Using the Flow-Through Manifold

Referring back to FIG. 7, it may be desirable to introduce a gaseous reactant, catalyst or other chemistry into the vessel 16. Using the flow-through manifold 600, each manifold inlet/outlet port 604 for a single bar 602 is joined in fluid communication as previously described and shown in FIGS. 17a and 17b. The inlet ports 604 are coupled to a common gas passage 608, and the common gas passage 608 is coupled to a single gas source. Referring to FIG. 7, this assembly is then coupled, for example, to opening 20 so as to establish fluid communication with flow path 20a, and the gas from the common gas source is injected through common passage 608 into the inlet ports 604 and thus into the flow path 20a where the gas is caused to be received in each associate vessel 16. Specifically, the gas travels through the flow path 20a, through the flow path 33a and into the opening 35a where it is received in the dip tube 32a and allowed to flow into the vessel 16. The introduction of the gas into the vessel 16 can occur even if the pressure of the vessel 16 is different from ambient conditions.

The introduction of the gas into the vessel 16 can cause a pressure increase at the particular well 14. Thus, the well 14 can be vented to the head space 17 through flow path 21b. To maintain the uniform gas flow rate through each respective well 14, the port to be vented to the head space 17 is generally opposite that through which the gas was introduced; hence the selection of flow path 21b.

The remaining flow path can be coupled to the sampling manifold, for example the flow path 20b would be coupled to the sampling manifold 58 in the manner previously described, while the remaining flow paths 21a could be plugged or vented to the head space 17. This arrangement permits a sample to be withdrawn from the vessel 16 through the flow path 20b using the procedure for withdrawing a sample previously discussed.

If it is desirable to have different gas flow rates through the flow paths 20a, each inlet port 604 of the flow-through manifold 600 can be coupled to a separate gas supply.

Using the General Use Manifold 56 and Static Pressure Manifold 700

The general use manifold 56 and the static pressure manifold 700 can also be used in the manner previously described herein to provide alternative flow paths and/or to permit the introduction of chemistry into each vessel 16.

Withdrawing a Sample

Another important aspect of the parallel reactor 10 is the ability to withdraw a sample from the reactor wells 14 at any time during the course of the experiment. The sample can be withdrawn while the well 14 is under pressure. Additionally the sample can be withdrawn without reducing the pressure in the well 14.

To withdraw a sample, the first tubular member 72 is coupled in fluid communication with the vessel 16; more particularly, the tubular member 72 is coupled in fluid communication with the dip tube 32a, as shown in FIG. 15. When the knob 70b is rotated to open the first flow control valve 62 to ambient conditions, the resultant pressure across drop the tubular member 72 causes the back pressure in the well 14 to push a small volume of the sample out of the vessel 16 and into the sample loop 94 (third tubular member). More specifically, the path of the sample out of the respective vessel 16 could be as follows:

When the knob 70b is rotated to the open position, a small amount of the sample is pushed out of the vessel and into the dip tube 32a and exits the vessel 16 at the opening 35, as best illustrated by the flow paths shown in FIG. 7. The sample continues through the flow path 33a and exits the stir top assembly 26 though the opening 33. Upon exiting the opening 33, the sample passes through the respective opening 27 and enters the flow path 20a and continues on through the opening 20, where it enters the manifold assembly 56 inlet/outlet flow path 53a and passes into first tubular member 72. The back pressure in the well 14 (or vessel 16) causes the sample to continue through the tubular member 72, through the valve 62, into the second tubular member 83 and through the normally open valve 64 to fill the sample loop (third tubular member 94).

Once the knob 70b has been closed, the knob 90b associated with the second flow control valve 64 can be can be rotated so as to open flow path 85 between the second flow control valve 64 and the sample vial 98. Opening of the flow path 85, results in a pressure drop across the sample loop 94 (third tubular member), thus causing the sample fluid to be pushed back through the second flow control valve 64 via the third tubular member 94, into the fourth tubular member 96 and finally into the sample vial 98.

Once the sample has been deposited in the sample vial 98, residual amounts of the can sample remain in the tubular members 94, 96 and the valve 64. These residual amounts of the sample can be flushed from tubular members 94, 96 by directing the nitrogen gas through the fifth tubular member 110 by rotating the control knob 102b to open a flow path through the flow control valve 66 and the nitrogen gas.

When valve 66 has been opened, the nitrogen gas, preferably at a pressure within the range of one and 20 psi, can be directed through the fifth tubular member 114. The low pressure gas flows through the valve 66 and into the third tubular member 94, though the valve 64, and through the fourth tubular member 96, consequently forcing any residual amounts of the sample out of the tubular members 94, 96 and the valve 62.

The parallel reactor 10 can be operated using semi-continuous or continuous processes, wherein chemistry can be metered into the respective wells 14 (vessels 16) at a controlled rate. Other processes are conducted in a continuous manner, where chemistry can be metered into the respective wells 14 (vessels 16) at a controlled rate, while products or other chemistry is simultaneously removed from the reactor.

The flowing examples illustrate the principles and advantages of the invention.

EXAMPLE 1

Liquid Phase Hydrogenation Reaction (High Pressure Sampling)

The parallel reactor 10 can be used for chemical reactions such as hydrogenation, oxidation, carbonylization and polymerization under pressure. The chemicals to be reacted can be in the form of a liquid, solid or slurry. The following example illustrates a typical use of the parallel reactor 10.

FIG. 1 illustrates the configuration of the parallel reactor system 10 that could be used for this example 1, with the following exceptions: the reactor system 10 could be assembled using the static pressure manifold bar 700 and the blank injection manifold 54.

To set up the experiment, clean each component comprising the reactor system 10 with tetrahydrofuran (THF) and replace O-ring seals and stirring blades 40. Attach the static pressure manifold 700 to the reactor block such that the flow path 21a is coupled to a common pressure source—Hydrogen gas. The remaining flow paths 20a, 20b and 21b are plugged. The stir top assembly 26 is set up using the blank manifold assembly 54; therefore, no additional chemistry or other reagents can be introduced into the respective vessels 16 during the experiment.

To prepare the chemistry to be evaluated, add approximately 5.0 ml of THF containing 50.0 mg of fine powder catalyst of including 10 wt. % Palladium metal supported on activated Carbon and 100 mg of 2-ethyl-6-methyl-N-(1-methoxy-2-propylidene) aniline, the starting material, to eight glass vessels 16. Place the vessels 16 in a respective well 14 of the reactor block 12. Once the vessels 16 have been added to the reactor wells 14, lower the stir top assembly 26 onto the reactor block 12 and tighten all head bolts.

Next, fill and vent the each well 14 with approximately 25 psi of Hydrogen. Repeat the fill and vent sequence four times. This action purges the respective reactor wells 14, removing all or substantially all of the air from each well 14.

After the fill and vent sequence, pressurize the respective reactor wells 14 to 1000 psi using Hydrogen and then activate the stirring blade assembly 30 to mix agitate reaction mixtures at 600 rpm. Set the temperature of each well 14 as follows:

TABLE 1

| Reactor well 14 | Temperature (C.) |
|---|---|
| 1 | 30 |
| 2 | 35 |
| 3 | 40 |
| 4 | 45 |
| 5 | 50 |
| 6 | 55 |
| 7 | 60 |
| 8 | 65 |

When the temperature at each well 14 stabilizes, continue to mix or agitate the reaction mixtures for 48 hours at 600 rpm. During the course of the 48-hour period withdraw samples from the reactor 10 at the following hourly intervals, while maintaining the temperature and pressure of each vessel: 2, 4, 6, 12, 24, 36, and 48.

Each sample withdrawn from the respective wells 14 can be analyzed using gas chromatography to ascertain the effect of temperature on the reactions, e.g., each sample can be evaluated to ascertain the quantity of the final product, N-(1-methoxy-2-propyl)-2-ethyl-6-methylaniline, produced during the experiment.

To end the experiment, reduce the temperature of each well 14 to 25° C. and slowly vent the reactor block 12 through the openings 21a. Once the parallel reactor 10 has been vented, the stir top assembly 26 can be removed and the parallel reactor 10 cleaned using an appropriate solvent.

This experiment permits the chemist to examine the effect of temperature on identical reaction mixtures. Using this information, the chemist can determine optimum thermal conditions for reactions utilizing the reaction mixture or a particular catalyst.

If desired, the parallel reactor 10 could be set up using the flow through manifold so as to permit the continuous or semi-continuous introduction of additional chemistry into the reactor wells 14. Additionally, the stir top assembly 26 could be set up using the injector manifold 46 to permit even more chemistry to be added to each reactor well 14.

EXAMPLE 2

Method of Using Parallel Reactor 10

This illustrative example describes how the parallel reactor 10 can be used to screen, characterize or evaluate various material and thermal properties, including, but not limited to, molecular weight, specific gravity, elasticity, dielectric constant, conductivity or calorimetric data.

Reactor Block Assembly Set-up

FIG. 1 illustrates an embodiment of a parallel reactor assembly that can be used to perform the following screening of various materials. The parallel reactor can include eight reactor wells, each well supporting a removable vessel that prevents direct contact of the reaction mixture with the well 14.

In this illustrative experiment, the reactor assembly also includes a stir top assembly supporting a stirring blade assembly for mixing the reaction mixtures, a pair of dip tubes and a blank injection manifold. The reactor assembly also includes a heater and motor control box assembly for controlling the temperature of each reactor well and the operation of the motor controlling the stirring blade assembly.

Eight different reaction mixtures can be manually loaded into each of the vessels 16. The reactor wells 14 can be pressurized in the manner described in Example 1. At any point during the experiment, a small sample of the reaction mixture in each vessel 16 can be removed and independently analyzed.

A Method of Using Parallel Reactor 10

A method of processing multiple reaction mixtures using the reactor 10 in can include the steps of (1) providing interchangeable manifolds having inlet/outlet ports in fluid communication with the respective reactor wells, wherein a fluid can be introduced into, withdrawn from or vented through the respective reactor wells; and (2) evaluating one or more properties of the reaction mixtures or a portion of the reaction mixture by measuring at least one characteristic of the reaction mixtures during at least a portion of the reaction. Additionally, the method could include the step of sampling a portion of the reaction mixture from the respective reactor wells via at least one of the interchangeable manifolds, wherein sampling occurs at a pressure greater than ambient conditions and without reducing the pressure in the respective reactor wells. And the step of providing the reactor wells with starting mixtures can be performed by a robotic materials handling system or the starting materials could be manually added to the respective reactor wells.

Additionally the parallel reactor 10 can be set up to include the further steps of: (1) applying a positive pressure to the respective reactor wells, wherein and the maximum pressure can reach 1500 psi and (2) introducing a fluid or additional chemistry into the respective reactor wells under pressure.

The versatility of the parallel reactor 10 permits the reactor 10 to be set up to include the additional step of venting outlet ports associated with the respective reactor wells to a head space defined by the reactor wells. And the further step of providing an inlet port in fluid communication with the respective reactor wells so as to establish a common flow path to the respective reactor wells, wherein the method of using the parallel reactor 10 can include the further steps of (1) providing an outlet port in fluid communication with the respective reactor wells so as to vent the respective reactor wells to a head space defined by the respective reactor wells or plugging said outlet port to prevent fluid flow therethrough; (2) coupling the respective reactor wells to a common pressure source so as to establish a common pressure across the respective reactor wells.

Where a common pressure has been established across the respective reactor wells the method of use can include the additional step of providing an outlet port in fluid communication with the respective reactor wells so as to vent the respective reactor wells to a head space defined by the respective reactor wells or plugging said outlet port to prevent fluid flow therethrough.

The property evaluated during the evaluation step can include molecular weight, specific gravity, elasticity, dielectric constant, conductivity or calorimetric data. The evaluation step can be carried out by monitoring the temperature of each reaction mixture or by monitoring heat transfer rates into or out of the respective reactor wells. Monitoring the heat transfer rates into or out of the reactor wells can include the steps of: (1) measuring temperature differences between each of the reaction mixtures and a thermal reservoir surrounding the reactor wells; and (2) determining heat transfer rates from a calibration relating the temperature differences to heat transfer rates.

The heat transfer rates observed during the monitoring step can be used to compute the conversion of the starting materials. And the rates of reaction can be determined using the conversion of starting materials information. In particular, the end point of the reaction can be easily detected due to the absence of either endothermic or exothermic characteristics in the reaction mixture. The end point of the reaction can be determined using data concerning the consumption of the starting materials.

During the experiment, the reaction mixtures can be agitated by (1) bringing a stirring blade assembly into contact with the reaction mixtures, the stirring blade assembly including a spindle supporting a rotatable stirring blade; and (2) rotating each of the stirring blades so as to cause agitation or mixing of the reaction mixtures. As previously discussed, the stirring blade assembly 30 is rotated by a motor 19 driven gear drive system. And the power needed to rotate each of the stirring members during the rotating step can provide a basis for evaluating the reaction mixtures.

The reaction mixtures can also be evaluated by monitoring the torque needed to rotate the stirring blade assembly 30. The torque supplied to the stirring blade assembly 30 can be monitored by measuring the phase lag between the torque and the stirring blade assembly 30.

Additionally, the torque can be a basis for evaluating the reaction mixtures by determining the viscosity of each of the reaction mixtures using a calibration relating torque and viscosity or power and viscosity, where power is the amount of energy required to drive the stirring blade assembly 30. This method of evaluating the reaction mixtures can include the steps of (1) measuring the heat transfer rates into or out of the vessels; (2) computing the conversion of the starting materials based on heat transfer into or out of the vessels; and (3) calculating the molecular weight of a component of the reaction mixtures based on conversion of the starting materials and the viscosity of each of the reaction mixtures.

Another method for evaluating the reaction mixtures can include the steps of (1) measuring the heat transfer rates into or out of the vessels 16; (2) computing conversion of the starting materials based on heat transfer rates into or out of the vessels 16; and (3) calculating molecular weight of a component of the reaction mixtures based on conversion of the starting materials and on viscosity of each of the reaction mixtures.

An advantage of the parallel reactor assembly is the ability to remove a portion of the reaction mixture from the respective reactor wells. The removal step can include the further step of removing a portion of the reaction mixture from the respective reactor wells includes the further step of establishing a fluid flow path in fluid communication with the respective reactor wells and ambient conditions, wherein a portion of the reaction mixture can be forced out of the respective reactor wells and into a sample loop when the fluid flow path is exposed to ambient conditions.

The method of removing a portion of the reaction mixture from respective reactor well can further include the steps of (1) providing first flow control valves having an inlet port supporting a first tubular member, the first tubular member having one end in fluid communication with the respective reactor wells and a second end supported by the first flow control valve such that the second end can be exposed to ambient conditions, whereby the back pressure in the respective reactor wells pushes a portion of the reaction mixture into the first tubular member when the second end of the tubular member is exposed to ambient conditions; (2) providing a second tubular member having one end in fluid communication with the first flow control valve and a second end in fluid communication with a selectively openable and closeable inlet port of a second flow control valve, wherein the portion of the reaction mixture drawn into the first tubular member can flow through the second tubular member, through the second flow control valve via an inlet/outlet port of the second flow control valve and into the sample loop, said sample loop having one end supported by the inlet/outlet port and an opposite end supported by a third flow control valve; (3) providing a fourth tubular member in fluid communication with the second flow control valve and a sample vial, the fourth tubular member having a first end in fluid communication with a selectively openable and closeable outlet port defined by the second flow control valve and a second end in fluid communication with the sample vial, wherein the portion of the reaction mixture drawn into the sample loop can flow back through the second flow control, through the fourth tubular member and into the sample vial when the outlet port of the second flow control valve is opened; and (4) providing a fifth tubular member having one end in fluid communication with a selectively openable and closeable inlet port defined by the third flow control valve and a second end in fluid communication with a supply of pressurized fluid, wherein the pressurized fluid can be caused to flow through the third flow control valve, the second flow control valve, the sample loop and the fourth tubular member upon opening the inlet port of the third flow control valve, closing the inlet port of the second flow control valve and opening a flow path between the sample loop and the sample vial and opening the second inlet port of the second flow control valve.

In an alternative method of using the parallel reactor system 10, the step of providing the reactor well with starting materials can include the step of providing starting materials in the form of a liquid, solid or slurry. Further still, the step of providing the reactor wells with starting materials can include the step of adding a heterogeneous, homogeneous or asymmetric catalyst to the starting materials. Even further still, the step of providing can include the step of providing starting materials for conducting polymerization or hydrogenation reactions.

Alternatively, if the parallel reactor 10 is placed in the chamber 100, as previously discussed, the step of providing the starting mixtures to the respective chambers could include the additional step of blanketing the reactor wells in an inert gas atmosphere while providing the respective reactor wells with the starting materials.

Preferred embodiments of the present invention have been disclosed. The explanations and illustrations presented herein are intended to acquaint others skilled in the art with the invention, its principles, and its practical application. A person of ordinary skill in the art would realize, however, that certain modifications would come within the teachings of this invention. Therefore, the following claims should be studied to determine the true scope and content of the invention.

What is claimed is:

1. A method of parallel processing multiple reaction mixtures comprising the steps of:
providing reaction chambers with starting materials to form reaction mixtures;
agitating the reaction mixtures during at least a portion of the experiment;
providing interchangeable manifolds having inlet/outlet ports in fluid communication with the respective reaction chambers, wherein a fluid can be introduced into, withdrawn from or vented through the respective reaction chambers; and
evaluating one or more properties of the reaction mixtures or portions of the reaction mixtures by measuring at least one characteristic of the reaction mixtures during at least a portion of the reaction.

2. The method of claim 1, further including the step of sampling a portion of the reaction mixture from the respective reaction chamber via at least one of the interchangeable manifolds, wherein sampling occurs at a pressure greater than ambient conditions and without reducing the pressure in the respective reaction chambers.

3. The method of claim 1 further including the step of filtering fluid introduced into or withdrawn from the respective reaction chambers.

4. The method of claim 1 further including the step of applying a positive pressure to the respective reaction chambers, wherein the maximum pressure is 1500 psi.

5. The method of claim 1 further including the step of introducing a fluid into the respective reaction chambers under pressure.

6. The method of claim 5 further including the step of venting outlet ports associated with the respective reaction chambers to a head space defined by the reaction chambers.

7. The method of claim 5 further including the step of providing an inlet port in fluid communication with the respective reaction chambers so as to establish a common flow path to the respective reaction chambers.

8. The method of claim 7 further including the step of providing an outlet port in fluid communication with the respective reaction chambers so as to vent the respective reaction chambers to a head space defined by the respective reaction chambers or plugging said outlet port to prevent fluid flow therethrough.

9. The method of claim 5 further including the step of coupling the respective reaction chambers to a common pressure source so as to establish a common pressure across the respective reaction chambers.

10. The method of claim 9 further including the step of providing an outlet port in fluid communication with the respective reaction chambers so as to vent the respective reaction chambers to a head space defined by the respective reaction chambers or plugging said outlet port to prevent fluid flow therethrough.

11. The method of claim 1, wherein the reaction chambers are provided with starting materials using a robotic materials handling system.

12. The method of claim 11 further including the step of placing the reaction chambers in a sealed enclosure.

13. The method of claim 12 further including the step of blanketing the respective reaction chambers in an inert gas atmosphere while providing the respective reaction chambers with the starting materials.

14. The method of claim 1, wherein the reaction mixtures are evaluated by monitoring a temperature of each of the reaction mixtures.

15. The method of claim 1, wherein the reaction mixtures are evaluated by monitoring heat transfer rates into or out of the respective reaction chambers.

16. The method of claim 15, wherein monitoring the heat transfer rates comprises the steps of:
measuring temperature differences between each of the reaction mixtures and a thermal reservoir surrounding the reaction chambers; and
determining heat transfer rates from a calibration relating the temperature differences to heat transfer rates.

17. The method of claim 15 further comprising computing conversion of the starting materials based on the heat transfer rates of the monitoring step.

18. The method of claim 17, further comprising determining rates of reaction based on conversion of the starting materials.

19. The method of claim 1, wherein the agitating step comprises:
bringing a stirring blade assembly into contact with the reaction mixtures, the stirring blade assembly including a spindle supporting a rotatable stirring blade; and
rotating each of the stirring blades so as to cause agitation or mixing of the reaction mixtures.

20. The method of claim 1, wherein the stirring blades rotate at the same rate, the stirring blades being driven by a motor driven gear drive system.

21. The method of claim 19, wherein the reaction mixtures are evaluated by monitoring the torque needed to rotate the stirring blade assembly.

22. The method of claim 21, wherein the torque is monitored by measuring the phase lag between the motor torque and the stirring blade assembly.

23. The method of claim 21, wherein the reaction mixtures are evaluated by determining the viscosity of each of the reaction mixtures from a calibration relating torque and viscosity.

24. The method of claim 23, wherein the reaction mixtures are evaluated by the steps of:
measuring the heat transfer rates into or out of the respective reaction chambers;
computing conversion of the starting materials based on heat transfer rates into or out of the respective reaction chambers; and
calculating molecular weight of a component of the reaction mixtures based on conversion of the starting materials and on viscosity of each of the reaction mixtures.

25. The method of claim 19, wherein the evaluating step further comprises the step of monitoring the power needed to rotate each of the stirring blade assemblies in the rotating step.

26. The method of claim 25, wherein the reaction mixtures are evaluated by determining the viscosity of each of the reaction mixtures from a calibration relating power and viscosity.

27. The method of claim 26, wherein the reaction mixtures are evaluated by the steps of:
measuring the heat transfer rates into or out of the respective reaction chambers;
computing the conversion of the starting materials based on heat transfer into or out of the reaction chambers; and calculating the molecular weight of a component of the reaction mixtures based on conversion of the starting materials and the viscosity of each of the reaction mixtures.

28. The method of claim 1, wherein the property evaluated during the evaluation step includes molecular weight, specific gravity, elasticity, dielectric constant, conductivity or calorimetric data.

29. The method of claim 1, further comprising the step of removing a portion of the reaction mixture from the respective reaction chambers by establishing a fluid flow path in fluid communication with the respective reaction chamber and ambient conditions, wherein said portion of the reaction mixture can be forced out of the respective reaction chamber and into a sample loop when the fluid flow path is exposed to ambient conditions.

30. A method of parallel processing multiple reaction mixtures comprising the steps of:
providing reaction chambers with starting materials to from reaction mixtures;
agitating the reaction mixtures during at least a portion of the experiment;
providing interchangeable manifolds having inlet/outlet ports in fluid communication with the respective reaction chambers, wherein a fluid can be introduced into, withdrawn from or vented through the respective reaction chambers; and
evaluating one or more properties of the reaction mixtures or portions of the reaction mixtures by measuring at least one characteristic of the reaction mixtures during at least a portion of the reaction;
establishing a fluid flow path in fluid communication with the respective reaction chambers and ambient conditions, wherein said portion of the reaction mixture can be forced out of the respective reaction chamber and into a sample loop when the fluid flow path is exposed to ambient conditions, and
providing first flow control valves, each valve having an inlet port supporting a first tubular member, the first tubular member having one end in fluid communication with a respective reaction chamber and a second end supported by the first flow control valve such that the second end can be exposed to ambient conditions, whereby the back pressure in the respective reaction chamber pushes a portion of the reaction mixture into the first tubular member when the second end of the tubular member is exposed to ambient conditions.

31. The method of claim 30, further including the step of:
providing a second tubular member having one end in fluid communication with the first flow control valve and a second end in fluid communication with a selectively openable and closeable inlet port of a second flow control valve, wherein the portion of the reaction mixture drawn into the first tubular member can flow through the second tubular member, through the second flow control valve via an inlet/outlet port of the second flow control valve and into the sample loop, said sample loop having one end supported by the inlet/outlet port and an opposite end supported by a third flow control valve.

32. The method of claim 31, further including the step of:
providing a fourth tubular member in fluid communication with the second flow control valve and a sample vial, the fourth tubular member having a first end in fluid communication with a selectively openable and closeable outlet port defined by the second flow control valve and a second end in fluid communication with the sample vial, wherein the portion of the reaction mixture drawn into the sample loop can flow back through the second flow control, through the fourth tubular member and into the sample vial when the outlet port of the second flow control valve is opened.

33. The method of claim 32, further including the steps of:
providing a fifth tubular member having one end in fluid communication with a selectively openable and closeable inlet port defined by the third flow control valve and a second end in fluid communication with a supply of pressurized fluid, wherein the pressurized fluid can be caused to flow through the third flow control valve, the second flow control valve, the sample loop and the fourth tubular member upon opening the inlet port of the third flow control valve, closing the inlet port of the second flow control valve and opening a flow path between the sample loop and the sample vial and opening the second inlet port of the second flow control valve.

34. The method of claim 1, wherein the step of providing the reaction chamber with starting materials includes the step of providing starting materials in the form of a liquid, solid or a slurry.

35. The method of claim 1, wherein the step of providing the reaction chambers with starting materials can further include the step of adding a heterogeneous, homogeneous or asymmetric catalyst to the starting materials.

36. The method of claim 1, wherein the step of providing includes the step of providing the reaction chambers with starting materials for conducting polymerization or hydrogenation reactions.

37. The method of parallel processing of reaction mixtures, comprising the steps of:
conducting a first series of parallel reactions in a first parallel reactor system comprising a reactor block including reaction chambers and fluid flow paths, said fluid flow paths being in fluid communication with respective reaction chambers, and a first manifold assembled with said reactor block to define a plurality of inlet/outlet port in fluid communication with respective fluid flow paths;
after said conducting step, removing said first manifold from said reactor block;
replacing said first manifold with a second manifold having a configuration different from said first manifold to form a second parallel reactor system; and
conducting a second series of parallel reactions in said second parallel reactor system.

38. A method as set forth in claim 37 wherein said first manifold is at least one of a general use manifold, a flow-through manifold, and a static pressure manifold, and wherein said second manifold is another of said at least one of a general use manifold, a flow-through manifold, and a static pressure manifold.

39. A method as set forth in claim 37 wherein said replacing comprises replacing said first manifold with a second manifold having a different configuration of inlet/outlet ports from said first manifold.

40. A method as set forth in claim 37 wherein the parallel reactor system further comprises a reactor head removably attached to said reactor block, and wherein said first and second manifolds are configured for removable attachment to said reactor block.

* * * * *

UNITED STATES PATENT AND TRADEMARK OFFICE
CERTIFICATE OF CORRECTION

| | |
|---|---|
| PATENT NO. | : 7,045,358 B2 |
| APPLICATION NO. | : 10/665796 |
| DATED | : May 16, 2006 |
| INVENTOR(S) | : Chandler, Jr. |

Page 1 of 1

It is certified that error appears in the above-identified patent and that said Letters Patent is hereby corrected as shown below:

Page 2 of the Title Page, Item (56) References Cited, FOREIGN PATENT DOCUMENTS, line 6, "GB  605517  10/1948" should be replaced with --GB  609517  10/1948--

Page 2, of the Title page, Item (56) References Cited, OTHER PUBLICATIONS, line 43, Add "Salvet et al., Chem Abstr. 1997, 126, abstract 200993h"

Col. 31, Line 49, replace "claim 5" with --claim 7--

Col. 34, Line 33, replace "The method" with --A method--

Col. 34, Line 41, replace "port" with --ports--

Signed and Sealed this

Fifteenth Day of August, 2006

JON W. DUDAS
*Director of the United States Patent and Trademark Office*